US010497048B2

(12) United States Patent
Short et al.

(10) Patent No.: US 10,497,048 B2
(45) Date of Patent: Dec. 3, 2019

(54) IDENTIFYING ITEMS IN IMAGES

(71) Applicant: Accenture Global Solutions Limited, Dublin (IE)

(72) Inventors: Matthew Thomas Short, San Jose, CA (US); Mary Elizabeth Hamilton, San Mateo, CA (US); Robert Dooley, Dublin, CA (US); David T. Nguyen, San Jose, CA (US); Leeann Chau Tuyet Dang, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 12 days.

(21) Appl. No.: 16/246,595

(22) Filed: Jan. 14, 2019

(65) Prior Publication Data

US 2019/0188777 A1    Jun. 20, 2019

Related U.S. Application Data

(63) Continuation of application No. 15/256,048, filed on Sep. 2, 2016, now Pat. No. 10,223,732.
(Continued)

(51) Int. Cl.
*G06Q 30/06* (2012.01)
*G06K 9/62* (2006.01)
(Continued)

(52) U.S. Cl.
CPC ....... *G06Q 30/0633* (2013.01); *G06F 3/0482* (2013.01); *G06F 3/0488* (2013.01);
(Continued)

(58) Field of Classification Search
CPC .............. G06Q 30/0633; G06Q 10/02; G06Q 30/0202; G06Q 30/0261; G06Q 50/12;
(Continued)

(56) References Cited

U.S. PATENT DOCUMENTS 6,076,071 A * 6/2000 Freeny, Jr. ............. G06Q 20/20
705/14.1
6,868,396 B2 * 3/2005 Smith .................. G06Q 10/087
705/26.9
(Continued)

*Primary Examiner* — Manav Seth
(74) *Attorney, Agent, or Firm* — Fish & Richardson P.C.

(57) ABSTRACT

Methods, systems, and apparatus, including computer programs encoded on computer storage media, for using location data to identify and provide services in association with items appearing in captured images. One of the methods includes receiving, from a device, an image and location data representing the device's physical location, determining, based on the location data, that a particular set of one or more locations are within a threshold distance of the device's physical location, accessing, for each of the one or more locations in the particular set, item information that indicates one or more items that are associated with the location, determining, based on the accessed item information, that the image likely shows a particular item that is associated with one or more locations in the particular set, and providing, to the device, instructions for presentation of information about (i) the particular item and (ii) one or more locations in the particular set that are associated with the particular item.

17 Claims, 21 Drawing Sheets

Related U.S. Application Data

(60) Provisional application No. 62/214,562, filed on Sep. 4, 2015.

(51) Int. Cl.

| | | |
|---|---|---|
| *G06Q 30/02* | (2012.01) | |
| *G06F 3/0488* | (2013.01) | |
| *G06F 16/29* | (2019.01) | |
| *G06F 16/58* | (2019.01) | |
| *G06F 16/9537* | (2019.01) | |
| *G06F 3/0482* | (2013.01) | |
| *G06F 3/0484* | (2013.01) | |
| *G06Q 10/02* | (2012.01) | |
| *G06Q 50/12* | (2012.01) | |

(52) U.S. Cl.
CPC ........... *G06F 3/04842* (2013.01); *G06F 16/29* (2019.01); *G06F 16/5866* (2019.01); *G06F 16/9537* (2019.01); *G06K 9/6288* (2013.01); *G06Q 10/02* (2013.01); *G06Q 30/0202* (2013.01); *G06Q 30/0261* (2013.01); *G06Q 50/12* (2013.01); *G06K 2209/27* (2013.01); *G06Q 30/0605* (2013.01)

(58) Field of Classification Search
CPC ............ G06Q 30/0605; G06F 16/5866; G06F 16/9537; G06F 16/29; G06F 3/0482; G06F 3/04842; G06F 3/0488; G06K 9/6288; G06K 2209/27
See application file for complete search history.

(56) References Cited

U.S. PATENT DOCUMENTS

| | | | | |
|---|---|---|---|---|
| 7,133,835 B1* | 11/2006 | Fusz | ............... | G06Q 30/0601 705/26.3 |
| 7,603,360 B2* | 10/2009 | Ramer | ............... | G06Q 20/102 |
| 7,680,694 B2* | 3/2010 | Glazer | ............... | G06Q 30/0253 705/26.43 |
| 7,860,886 B2* | 12/2010 | Loftesness | ............... | G06Q 10/02 707/771 |
| 7,933,806 B2* | 4/2011 | Fusz | ............... | G06Q 30/0601 705/26.1 |
| 8,156,136 B2* | 4/2012 | Davis | ............... | G06K 9/0063 707/766 |
| 8,250,481 B2* | 8/2012 | Klaric | ............... | G06K 9/0063 715/765 |
| 8,468,060 B2* | 6/2013 | Robb | ............... | G06Q 30/0623 705/26.1 |
| 8,600,784 B1* | 12/2013 | Ivey | ............... | G06Q 10/02 705/5 |
| 8,606,645 B1 | 12/2013 | Applefeld | | |
| 8,745,041 B1* | 6/2014 | Katragadda | ....... | G06F 16/24575 707/723 |
| 8,775,570 B2* | 7/2014 | Sandholm | ........... | G06F 16/9537 709/219 |
| 8,942,468 B1 | 1/2015 | Toshev et al. | | |
| 9,078,095 B2* | 7/2015 | Johnson | ............... | H04W 40/244 |
| 9,547,696 B2* | 1/2017 | Seth | ............... | G06F 16/24578 |
| 9,910,825 B1* | 3/2018 | Garman | ............... | G06Q 10/02 |
| 9,913,240 B2* | 3/2018 | Skaaksrud | ............... | H04W 12/06 |
| 10,130,232 B2* | 11/2018 | Atchley | ............... | G06Q 30/0633 |
| 10,189,691 B2* | 1/2019 | High | ............... | B60L 53/63 |
| 10,354,531 B1* | 7/2019 | Bronder | ............... | G06F 16/29 |
| 2002/0087505 A1* | 7/2002 | Smith | ............... | G06Q 10/087 |
| 2002/0130065 A1* | 9/2002 | Bloom | ............... | B07C 3/00 209/630 |
| 2008/0005071 A1* | 1/2008 | Flake | ............... | G06Q 30/0261 |
| 2010/0153008 A1 | 6/2010 | Schwartz | | |
| 2011/0004517 A1 | 1/2011 | Soto | | |
| 2011/0106656 A1 | 5/2011 | Schieffelin | | |
| 2011/0144908 A1* | 6/2011 | Cheong | ............... | G06Q 30/06 701/533 |
| 2012/0263388 A1* | 10/2012 | Vaddadi | ............... | G06K 9/627 382/225 |
| 2013/0036043 A1 | 2/2013 | Faith | | |
| 2014/0080428 A1 | 3/2014 | Rhoads | | |
| 2014/0129354 A1 | 5/2014 | Soon-Shiong | | |
| 2015/0026012 A1* | 1/2015 | Gura | ............... | G06Q 30/0643 705/26.62 |
| 2015/0109451 A1 | 4/2015 | Dhankar | | |
| 2015/0169597 A1* | 6/2015 | Edge | ............... | G06F 16/9537 707/751 |
| 2015/0213431 A1 | 7/2015 | Goldstein | | |

\* cited by examiner

IDENTIFYING ITEMS IN IMAGES

CROSS-REFERENCE TO RELATED APPLICATIONS

This application is a continuation of U.S. application Ser. No. 15/256,048, filed Sep. 2, 2016, now allowed, which claims the benefit of U.S. Provisional Patent Application Ser. No. 62/214,562, filed Sep. 4, 2015. Both of these prior applications are incorporated by reference in their entirety.

TECHNICAL FIELD

This disclosure generally relates to computer-implemented systems, methods, and other techniques for providing location-based services.

BACKGROUND

Some video systems may analyze an image to identify an objects shown in the image. For instance, a video system may use a neural network to determine a type of object shown in an image, such as a tree, a car, a person, or an item.

SUMMARY

This specification generally discloses techniques for using location data to identify items depicted in captured images. In some implementations, the techniques described herein may, in certain instances, realize one or more advantages. For example, one or more of the techniques described herein for using location data to identify items appearing in images may be leveraged in computing systems that determine item information for items depicted in images received from devices in certain geographic regions with an accurate, timely, and computationally-efficient manner, e.g., using fewer computer resources, such as memory, clock cycles, or both, compared to other systems that do not use the methods described below. In some implementations, one or more of the present techniques may enable computing systems to provide navigational instruction and other highly relevant guidance promoting the usage of routes that may yield time and energy savings.

In general, one innovative aspect of the subject matter described in this specification can be embodied in methods that include the actions of receiving, from a device, an image and location data representing the device's physical location, determining, based on the location data, that a particular set of one or more locations are within a threshold distance of the device's physical location, accessing, for each of the one or more locations in the particular set, item information that indicates one or more items that are associated with the location, determining, based on the accessed item information, that the image likely shows a particular item that is associated with one or more locations in the particular set, and providing, to the device, instructions for presentation of information about (i) the particular item and (ii) one or more locations in the particular set that are associated with the particular item.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These other versions may each optionally include one or more of the following features. In some implementations, accessing, for each of the one or more locations in the particular set, item information that indicates one or more items that are associated with the location may include accessing, for each of the one or more locations in the particular set, item information that indicates one or more items that are designated as being eligible for retrieval at the location, and determining, based on the accessed item information, that the image likely shows the particular item that is associated with one or more locations in the particular set may include determining, based on the accessed item information, that the image likely shows a particular item that is designated as being eligible for retrieval at one or more locations in the particular set.

In some instances, the actions may further include, in some of such implementations, determining, for each of the one or more locations associated with the particular item, a predicted amount of time that a task of retrieving one or more items at the location would take, ranking the one or more locations associated with the particular item based on the predicted amounts of time, generating a set of instructions for presentation of information about (i) the particular item and (ii) one or more locations in the particular set, ordered based on the ranking, that are associated with the particular item. In such instances, providing, to the device, instructions for presentation of information about (i) the particular item and (ii) one or more locations in the particular set that are associated with the particular item may, for example, include providing the generated set of instructions to the device.

In addition, determining, for each of the one or more locations associated with the particular item, a predicted amount of time that a task of retrieving one or more items at the location would take may, in some of such instances, include determining, for a first location associated with the particular item, a first predicted amount of time that a task of retrieving one or more items at the first location is predicted to take and determining, for a second location associated with the particular item, a second predicted amount of time that a task of retrieving one or more items at the second location is predicted to take. The actions may, in some of such instances, further include determining that the first predicted amount of time is less than the second predicted amount of time. Ranking the one or more locations associated with the particular item based on the predicted amounts of time may, in some of such instances, include ranking the one or more locations associated with the particular item based on determining that the first predicted amount of time is less than the second predicted amount of time.

In some examples, ranking the one or more locations associated with the particular item based on determining that the first predicted amount of time is less than the second predicted amount of time may, in some of such instances, include, based on determining that the first predicted amount of time is less than the second predicted amount of time, assigning the first location a higher ranking than the second location.

In some implementations, the actions may, in some of such instances, further include determining, based on the location data, that the device is located a first distance away from the first location, determining, based on the location data, that the device is located a second distance away from the second location, determining that the first distance is greater than the second distance, based on determining that the first predicted amount of time is less than the second predicted amount of time and determining that the first distance is greater than the second distance, determining an incentive that is to be provided for retrieving the particular item at the first location. In these implementations, providing the generated set of instructions to the device may include providing, to the device, instructions for presentation of information about (a) the particular item, (b) the first location, (c) the second location, and (d) the determined incentive. In addition, the actions may, in some of such implementations, further include, at a particular time after providing the instructions for presentation of information to the device, receiving, from the device, updated location data representing the device's physical location at the particular time, determining, based on the updated location data, that the device is at the first location, and in response to providing the instructions for presentation of information to the device and determining that the device is at the first location, providing, to the device, instructions for presentation of one or more graphical or textual elements indicating an offer to redeem the determined incentive.

In some examples, the actions may further include determining, based on the location data, that a first set of one or more locations are within a first threshold distance of the device's physical location, accessing, for each of the one or more locations in the first set, item information that indicates one or more items that are associated with the location, determining, based on the accessed item information for the one or more locations in the first set, that the image does not satisfy a threshold likelihood for any of the one or more items that are associated with the one or more locations in the first set, and in response to determining that the image does not show any of the one or more items that are associated with the one or more locations in the first set, identifying a second threshold distance that is greater than the first threshold distance. In these examples, determining, based on the location data, that the particular set of one or more locations are within the threshold distance of the device's physical location may include after identifying the second threshold distance, determining, based on the location data, that a second set of one or more locations are within the second threshold distance of the device's physical location, the second set of one or more locations being different from the first set of one or more locations.

In some implementations, the actions may further include determining, based on the location data, that the device is located within a geographic region that is occupied by a particular venue or park. In these implementations, determining, based on the location data, that the particular set of one or more locations are within the threshold distance of the device's physical location may, for instance, include determining, based on the location data, that the particular set of one or more locations are (i) within the threshold distance of the device's physical location, and (ii) positioned within the geographic region that is occupied by the particular venue or park. In these implementations, the actions may, in some examples, further include determining that the device is associated with a particular user, accessing user information indicating one or more characteristics of the particular user and the particular user's visit to the particular venue or park, and based on the one or more characteristics of the particular user's visit to the particular venue or park, generating a set of instructions for presentation of information about (i) the particular item and (ii) one or more locations in the particular set that are associated with the particular item. In these examples, providing, to the device, instructions for presentation of information about (i) the particular item and (ii) one or more locations in the particular set that are associated with the particular item may include providing the generated set of instructions to the device.

In these examples, the actions may, in some instances, further include identifying, based on the accessed user information, one or more additional locations that are different from the particular set of locations. In such instances, generating the set of instructions may, for example, include generating a set of instructions for presentation of information about (i) the particular item, (ii) one or more locations in the particular set that are associated with the particular item, and (iii) the identified one or more additional locations. For example, at least some of the identified one or more additional locations may be outside of the geographic region that is occupied by the particular venue or park.

In some implementations, the actions may further include, for each item that is associated with one or more locations in the particular set, accessing, based on the accessed item information, imaging data that is associated with the item, and evaluating the image against the accessed imaging data. In such implementations, determining, based on the accessed item information, that the image likely shows the particular item that is associated with one or more locations in the particular set may, for instance, include determining, based on evaluating the image against the accessed imaging data, that the image likely shows a particular item that is associated with one or more locations in the particular set.

In some examples, the actions may further include, after providing, to the device, instructions for presentation of information about (i) the particular item and (ii) one or more locations in the particular set that are associated with the particular item, receiving, from the device, data indicating a user selection of a particular one of the one or more locations indicated in the instructions, and, in response to receiving data indicating the user selection of the particular location, providing, to one or more devices that are associated with the particular location, instructions for presentation of a notification about the particular item.

In some implementations, the actions may further include, in response to determining that the image likely shows the particular item that is associated with one or more locations in the particular set, accessing attribute information indicating one or more physical attributes of the particular item, ranking the one or more locations associated with the particular item based on the one or more physical attributes of the particular item, and generating a set of instructions for presentation of information about (i) the particular item and (ii) one or more locations in the particular set, ordered based on the ranking, that are associated with the particular item. In these implementations, providing, to the device, instructions for presentation of information about (i) the particular item and (ii) one or more locations in the particular set that are associated with the particular item may, for example, include providing the generated set of instructions to the device.

In some examples, the actions may further include, before providing, to the device, instructions for presentation of information about (i) the particular item and (ii) one or more locations in the particular set that are associated with the particular item, generating a first set of instructions for presentation of information about (i) a set of one or more items and (ii) one or more locations that are associated with the set of one or more items, and providing the first set of instructions to another, different device. The actions may, in these examples, further include, based on providing the first set of instructions to the other, different device, the actions may further include generating a second set of instructions for presentation of information about (i) the particular item and (ii) one or more locations in the particular set that are associated with the particular item. In these examples, providing, to the device, instructions for presentation of information about (i) the particular item and (ii) one or more locations in the particular set that are associated with the particular item may include providing the second set of instructions to the device.

In these examples, the actions may further include ranking the one or more locations associated with the particular item based on providing the first set of instructions to the other, different device. Generating the second set of instructions for presentation of information about (i) the particular item and (ii) one or more locations in the particular set that are associated with the particular item may, in some of these examples, include generating a second set of instructions for presentation of information about (i) the particular item and (ii) one or more locations in the particular set, ordered based on the ranking, that are associated with the particular item.

In some implementations, accessing, for each of the one or more locations in the particular set, item information that indicates one or more items that are associated with the location may include accessing, for each of the one or more locations in the particular set, an inventory of items at the location or a catalog of one or more items that are designated as being eligible for retrieval at the location.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
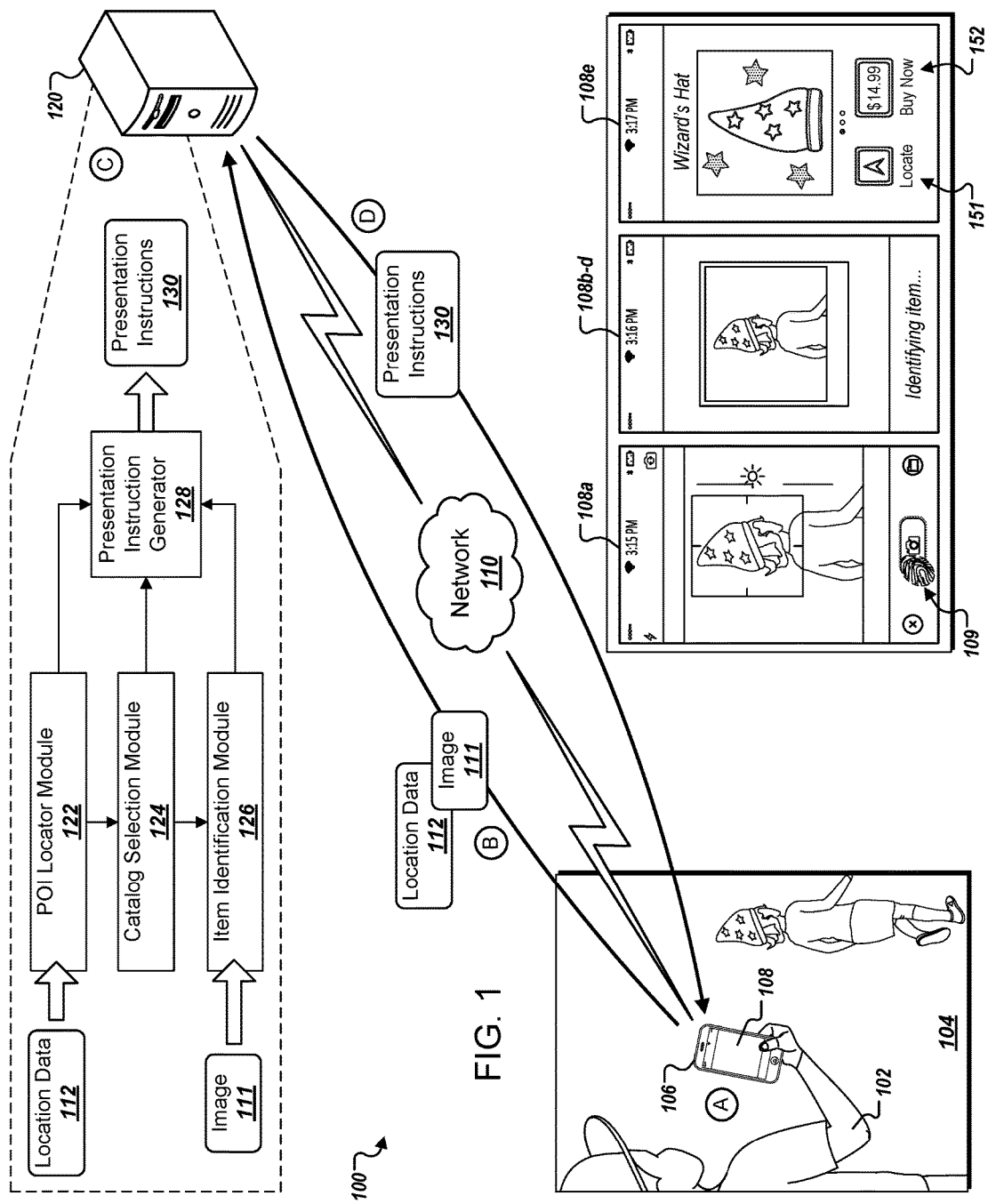
FIG. 1 is a conceptual diagram of an example framework for using location data to identify and provide services in association with items appearing in captured images.

In general, an aspect of the subject matter described in this specification may involve a system that provides guests of a venue, e.g., amusement park, store, stadium, shopping mall, festival grounds, etc., with information and services associated with items depicted in pictures taken by the guests. For instance, the system may communicate with an application which, when installed on a device, allows a guest to take a picture of an item, such as a product or other merchandise. The system receives information from the application, such as the picture or data representing a portion of the picture, a location of the device, or both, and uses the information to determine the item shown in the picture. The system may use the location of the device to determine an item catalog for a venue, e.g., a store, in which the device is physically located and use the item catalog to narrow the results for the type of item shown in the picture or to select the item from the list of items in the item catalog. Once the system identifies the item shown in the picture, the system may send the application information about the item, such as product details and a price of the item.

The device presents the information about the item to a user operating the device and may receive input representing a selection by the user to purchase the item. For example, the input may indicate whether the user will purchase the item from the venue, e.g., the item depicted in the picture, pick up the item at another physical location, or have the item delivered to them. The device provides data representing the input to the system and the system determines the type of purchase of the item. In some examples, when the system determines that the user is taking the item with them, the system may generate receipt information and send the receipt information, e.g., to the device for viewing by the user.

When the system determines that the user will pick the item up from another physical location, the system determines other physical locations from which the user may pick up the item, such as other stores, a warehouse, a kiosk, a locker, or another type physical location. The system generates a list of suggested locations and provides the list to the device for presentation to the user. The system may use information about the user, e.g., where the user parked or where the user lives or is staying, to generate the list. For instance, the system may rank a location by the entrance at which a user accessed the park as a first result and a location by a hotel at which the user is staying as a second result.

The system receives information from the device indicating another selection by the user of the physical location at which the user will pick up the item, and optionally at time at which the user will pick up the item, e.g., a specific time such as 10 AM or a time period such as between 8 PM and 9 PM. The system may then check whether the item is in stock at the selected physical location, e.g., store, pickup center, or locker. If the item is in stock, the system places the item on hold for the user, e.g., the purchased quantity of the item. If the item is not in stock, the system may send a request that the item be delivered to the physical location, e.g., before the time at which the user will pick up the item.

In some implementations, the system may communicate with an application that, when installed on a device, provides a user with instructions on where a item may be purchased. For instance, a user may be in an amusement park or a mall and want to know where another guest purchased a particular item. The user may take a picture of the item, e.g., using the application installed on the device. The application submits the picture, and optionally location information of the device, to the system. The system analyzes the picture to determine the item shown in the picture.

The system may use the location information to determine multiple stores or other venues physically located near the device and item catalogs for those stores, e.g., data about the items sold at those stores. The system may use the item catalog information to determine the item shown in the picture. For instance, instead of determining which item from all of the items sold are shown in the picture, the system may determine which items available at stores nearby might be shown in the picture.

The system determines a list of likely items and similar items that are available for purchase. The list may be for items available, e.g., for purchase, at stores or other physical locations near the location of the device. In some examples, the list may be for items available at a store in which the device is physically located.

FIG. 1 is a conceptual diagram of an example system 100 that provides a framework for using location data to identify and provide services in association with items appearing in captured images. System 100 may, for instance, represent one example of the system described above and throughout this specification. More particularly, the diagram depicts a computing device 120 in communication with a client device 106 over a network 110, that collectively make up system 100. In some examples, the system 100 may include the computing device 120 and not the client device 106. The diagram also depicts exemplary data that is communicated within system 100 in time-sequenced stages "A" to "D," respectively, as well as a user interface 108 that can be displayed by the client device 106 in various stages, labeled as user interfaces 108a to 108e. Briefly, and as described in further detail below, the computing device 120 may receive an image 111 and location data 112 from the client device 106, use location data 112 to identify one or more items shown in the image 111, and provide, to the client device 106, presentation instructions 130 that include information about the one or more identified items.

The computing device 120 may, for instance, represent one or more servers in one or more locations that are accessible to an entity that is associated with a venue, e.g., an owner or partner of the venue. In some examples, the computing device 120 may include a point of interest (POI) locator module 122, a catalog selection module 124, an item identification module 126, and a presentation instruction generator 128. Although depicted as a singular system, the architecture of computing device 120 may be implemented using one or more networked computing devices. The networked computing devices may be physical computing devices, virtual machines, or both.

The client device 106 may be a mobile computing device, such as a smartphone, personal digital assistant, tablet, laptop, cellular telephone, drone, camera, and the like. The client device 106 may, through execution of an application that is installed on the client device 106, display user interface 108. The application may be a web browser, an item information application, or another type of application. In some examples, the client device 106 may include or communicate with a camera or other imaging sensor capable of capturing pictures.

The client device 106 accesses the network 110 using a wireless connection, such as a cellular telephone data connection, a Wi-Fi connection, or other wireless connection that can be used for sending data to and receiving data from the computing device 120. In some implementations, the network 110 includes one or more networks, such as a local area network, a wide area network, and/or the Internet. One or more of the networks in the network 110 may be wireless, such as a cellular telephone network or a Wi-Fi network.

In stage A, the client device 106 may capture or otherwise obtain an image 111. For instance, the client device 106 may use an integrated camera to capture the image 111 in response to user interaction with a proximity-sensitive display or other sensing component of the client device 106. In the example depicted in FIG. 1, in stage A, a user 102 of the client device 106 provides a touch input 109 to a portion of a proximity-sensitive display of the client device 106 on which an interactive element of user interface 108a is displayed that controls operation of a camera that is integrated into the client device 106. It follows that, in stage A, the client device 106 receives data indicating touch input having been received at a portion of the proximity-sensitive display corresponding to such an interactive element of user interface 108a and, in response, uses the camera to capture the image 111.

The user 102 may, for instance, be a guest of a venue who uses the client device 106 to take a picture of an item at the venue that is of interest to the user 102. In the example of FIG. 1, the image 111 may represent a picture of a hat that user 102 spotted another guest wearing while at an amusement park. In this way, the user 102 may be able to obtain information about the hat appearing in image 111, such as information regarding the price of the hat, options for purchasing the hat, the locations within the amusement park at which the hat may be obtained, and the like. In some examples, the item may be on a shelf at the venue, shown in a poster at the venue, shown in a video at the venue, or a combination of two or more of these.

In stage B, the client device 106 may provide image 111 and location data 112 to the computing device 120 over network 110. Location data 112 may, for instance, represent physical location 104 of the client device 106. The physical location 104 of the client device 106, as indicated in location data 112, may correspond to the location at which the client device 106 captured the image 111 in stage A, the location of the client device 106 leading up to stage B, or a combination thereof. For example, location data 112 may include or be determined based on data obtained from global positioning system (GPS) componentry, an accelerometer, a gyroscope, a magnetometer, devices in short-range communication with the client device 106, or a combination thereof.

In some examples, the client device 106 may transmit the image 111 and location data 112 in response to receiving user input data. For instance, the client device may determine that the user input indicates a request that item identification analysis be performed to identify one or more items that appear in the image 111. In these examples, the client device 106 may, through execution of an application that is installed on the client device 106, display one or more user interface screens (not shown) between stages A and B to through which the client device 106 receives the user input indicating the request from one or more users of the client device 106, such as user 102. In stage B, the client device 106 may display another screen, such as user interface 108b-d shown in FIG. 1, to indicate that the requested item identification analysis is being performed on the image 111.

Upon receiving the image 111 and location data 112 from the client device 106, the computing device 120 may, in stage C, use the received data to perform one or more operations through which the computing device 120 identifies one or more items appearing in the image 111 and generates presentation instructions 130. The computing device 120 may perform such operations through use of the POI locator module 122, the catalog selection module 124, the item identification module 126, and the presentation instruction generator 128.

More specifically, the computing device 120 may leverage the POI locator module 122 to identify points of interest such as one or more physical locations at which guests of the venue may purchase, pick up, receive, or stow items. Examples of physical locations at which guests of the venue may purchase items include physical locations of stores, kiosks, and other establishments at the venue that sell and other products. Examples of physical locations at which guests of the venue may pick up or receive items may, for instance, include physical locations of parked vehicles belonging to guests of the venue, physical locations of hotel rooms at which guests of the venue are staying while visiting the venue, physical locations at which guests of the venue permanently reside, and other physical locations that are of convenience to guests during or after their visit to the venue.

The POI locator module 122 of the computing device 120 may be configured to receive input data indicating a physical location, determine one or more points of interest based on the input data, and generate an output indicating the determined one or more points of interest. In the example of FIG. 1, the POI locator module 122, in stage C, receives location data 112 representing the physical location of the client device 106, e.g., physical location 104, and uses the location data 112 to determine one or more points of interest. The computing device 120 may, for example, maintain or otherwise have access to one or more databases storing information regarding predefined points of interest at or around the venue or venues with which the computing device 120 is associated, and reference such information to make this determination. For instance, the POI locator module 122 may use such information to identify predefined points of interest that are within a certain distance from physical location 104. That is, the POI locator module 122 may determine the distance between physical location 104 and each predefined point of interest, and evaluate each determined distance against one or more thresholds to identify predefined points of interest that are sufficiently close to the client device 106.

The points of interest identified by the POI locator module 122 may be provided as input to the catalog selection module 124 of the computing device 120. The catalog selection module 124 may be configured to receive input data indicating one or more points of interest, obtain item information indicating one or more items that are associated with the points of interest identified in the input data, and generate an output indicating the obtained item information. In the example of FIG. 1, the catalog selection module 124, in stage C, receives data indicating the points of interest identified by the POI locator module 122, and uses the data received from the POI locator module 122 to obtain item information for each identified point of interest. The computing device 120 may, for example, maintain or otherwise have access to one or more databases storing item information in association with each of multiple, different predefined points of interest, and reference such information to obtain item information for each identified point of interest.

Item information that is stored in association with each predefined point of interest may include a list of items that are eligible for retrieval at the physical location of the respective predefined point of interest, such as one or more product catalogs. For example, item information that is stored in association with a point of interest corresponding to a store may include one or more catalogs of products that are available for purchase at the store, one or more catalogs of products that are manufactured or distributed by the company that manages the store, an up-to-date inventory of items that are currently in stock at the store, and the like. In another example, item information that is stored in association with a point of interest corresponding to a parking lot near the entrance of the venue may include one or more catalogs of products that are designated as being eligible for drop off or delivery, e.g., based on item weight or another attribute of the item. In this way, the items that are available for retrieval in the parking lot may be limited to items that are light enough for a robot or an employee of the venue to carry to the parking lot, items that are sold at stores within the immediate vicinity of the parking lot, and the like. In some examples, item information that is stored in association with each predefined point of interest may further include information regarding item pricing, features, specifications, availability, ordering options, warnings, and the like.

The catalog selection module 124 may identify and obtain such item information for each predefined point of interest identified by the POI locator module 122 as being within a threshold distance of physical location 104. The threshold distance may be a predetermined value, identified using data received from the client device 106, or both.

The catalog selection module 124 may provide the item information as input to the item identification module 126 of the computing device 120. The item identification module 126 may be configured to receive item information and an image, use the item information perform item identification analysis on the image, and generate an output indicating one or more items identified as likely appearing in the image. In the example of FIG. 1, the item identification module 126, in stage C, receives the image 111 and item information obtained by the catalog selection module 124, and uses the received item information to perform item identification analysis on the image 111 to identify one or more items that likely appear in the image 111. The item identification module 126 may determine a likelihood that that each of the items are the item depicted in the image 111. The item identification module 126 may compare the likelihoods for each of the items with a threshold likelihood. When the item identification module 126 determines that a likelihood for a particular item satisfies the threshold likelihood, e.g., is greater than or equal to the threshold likelihood, the item identification module 126 may determine that the particular item is likely depicted in the image 111.

The computing device 120 may, for example, maintain or otherwise have access to one or more databases storing image data in association with each item referenced in the item information, and reference such image data when analyzing the image 111 for items. Such image data may, for example, include one or more images of the item with which the item data is associated, template data that may be used for recognizing the item with which the item data is associated, item fingerprint data that indicate particular characteristics of the item, and the like. The item identification module 126 may, for instance, use the item information received from the catalog selection module 124 to obtain image data for each item that is associated with one or more of the points of interest identified by the POI locator module 122, and may evaluate the image 111 against the obtained image data to identify one or more items likely appearing in the image 111. That is, instead of evaluating the image 111 against all item image data stored in one or more of the databases that are maintained by or otherwise accessible to the computing device 120, the item identification module 126 may only evaluate the image 111 against image data for items that are available to guests of the venue at locations within the threshold distance from physical location 104. In this way, the computing device 120 may identify one or more items likely appearing in the image 111 in an efficient and accurate manner.

In some implementations, the item identification module 126 may leverage one or more image recognition or signal processing techniques to identify one or more items likely shown in the image 111. In the example of FIG. 1, the item identification module 126 may determine that a hat is likely depicted in the image 111, determine identification information for the hat, and generate an output that includes the identification information for the hat. The outputs generated by each of modules 122-126 may be provided as input to the presentation instruction generator 128.

The presentation instruction generator 128 may use the information it receives from each of modules 122-126 to generate presentation instructions 130 which, when used by the client device 106, enable the presentation of a variety of information associated with an item identified in the image 111, points of interest within the immediate vicinity of the client device 106 where the identified item may be available for retrieval, and the like. In addition, the presentation instruction generator 128 may rank the points of interest identified by the POI locator module 122 based on data received from the catalog selection module 124, the item identification module 126, and other data. Examples of such other data may, for instance, include user information, e.g., user preferences, browsing history, social media activity, venue ticketing and admissions information, travel itineraries, purchasing history, and other data associated with the client device 106 or one or more accounts having been accessed on the client device 106, predicted wait times for points of interest, venue metadata, data indicating one or more physical attributes of items, data transmitted from the computing device 120 over network 110 to one or more devices other than the client device 106, e.g., devices that are associated with other users, points of interest, venue personnel, etc., sensor data, data obtained using one or more statistical models or obtained from one or more analytics services, and the like.

In stage D, the computing device 120 may provide the presentation instructions 130 to the client device 106 over network 110. Upon receiving the presentation instructions 130 from the computing device 120, the client device 106 may present one or more user interfaces with graphical elements, textual elements, audible elements, or a combination of two or more of these, to convey such information associated with the image 111. In the example of FIG. 1, the client device 106, in response to receiving presentation information 130 in stage D, presents user interface 108e that includes graphical and textual elements 151-152 to present information regarding the hat shown in the image 111. Such graphical and textual elements 151-152 may, for instance, represent interactive elements of user interface 108e that, upon receipt of input indicating selection of one of the elements, cause the client device 106 to provide navigational instructions or other information indicating the geographic locations of one or more points of interest at which items in the image 111 may be obtained, initiate a transaction to purchase the item, or both.

In some examples, the presentation instructions 130 may instruct the client device 106 to display a list of different points of interest at which the one or more items identified in the image 111 may be obtained. After such a list is provided for display on the client device 106, the system 100 may receive data indicating a selection of one of the locations in the list and determine directions from the physical location 104 of the client device 106 to the selected location. The system may provide data for the directions to the application running on the client device 106. The client device 106, e.g., the application, may use the data for the directions to generate user interface 108, or another user interface on the client device 106, to guide the guest to the selected location.

In some implementations, the system 100 may suggest a location which is not the closest physical location to the location of the client device 106. For instance, the system 100 may determine that the closest location has a longer checkout wait time than the second closest location and recommend that the guest view or purchase the product from the second closest location instead of the first closest location.

In some examples, the system 100 may facilitate guest purchase of an item online. For instance, the system 100 may determine that all of the closest physical locations that have a product in stock have long checkout wait times or are predicted to have long checkout wait times and provide a recommendation to the client device 106 that the guest purchase the product, or view information about the product, by viewing a webpage, e.g., with a view online option in the user interface 108e.

In some implementations, the system 100 may provide an incentive for a guest to view or purchase a product from an online location or from a location that is not the closest to the physical location of the client device 106. For instance, the system 100 may generate a five dollar coupon, e.g., for a restaurant, and provide instructions for presentation of a recommendation to go to the third closest location that offers the product to receive the coupon. The recommendation may include information indicating that other closer locations have the product but are busier so the guest will receive the coupon if they view or purchase the product from the third closest location instead. The system 100 may use analytics to distribute guests throughout a venue, e.g., an amusement park, concert hall, sports stadium, a shopping mall, or another area with multiple shops and/or kiosks that carry the same product, to reduce the likelihood that a particular physical location will become extremely crowded and have long checkout wait times, e.g., compared to other stores with the same or similar products in nearby locations.

The system 100 may allow a guest to select a future time, a particular physical location, or both, at which the guest will pick up the product. For instance, the application may include another user interface that allows the guest to select the time, the location, or both. In response to receiving input from the guest, the client device 106 provides data representing the input to the computing device 120. The computing device 120 may then send a message to a computer at the location at which the guest will pick up the product, or another computer, to place the product on hold for the guest.

In some implementations, the computing device 120 may receive information from a client device that indicates selection of a product to add to a wish-list for a guest or a group of guests. For instance, the computing device 120 may send the application a list of potential products determined likely to be depicted in the picture and similar products. The application, e.g., executing on the client device 106, presents the list to a guest, e.g., user 102 of the client device 106, and receives input indicating that the guest added one or more of the products to a corresponding wish-list. The application sends data representing the input to another computer, e.g., the computing device 120, to cause an update to the guest's wish-list.

In some implementations, the system 100 may use information about a guest when generating directions. For instance, the system 100 may determine two routes to guide a guest from a current physical location, e.g., a physical location of the client device 106, to a location at which they may view or purchase a particular product. The system 100 may determine that one of the two routes passes by another physical location at which the guest may view a product on their wish-list and select that route. The system 100 provides information about the selected route to an application on the client device 106 to cause the application to provide instructions to the guest, e.g., for the route that passes by the other physical location at which the guest may view the product on their wish-list.

In some implementations, the system 100 may use information about a person included in a picture when determining a product shown in the picture. For instance, using privacy settings for the person, for the client device 106, or both, the system 100 may determine products that the person purchased, e.g., recently or in the past, and which of those products is shown in the picture. The system 100 may provide information about the determined product to the client device 106 for presentation of information about the determined product. In some examples, the system 100 may determine that the system 100 does not have purchase history information for the person that indicates the product shown in the picture, e.g., the product was a gift.

In some implementations, the system 100 may use a wish-list or preferences of a guest to determine a product shown in a picture. For example, the system 100 may receive an image from the client device 106, determine types of products the guest typically expresses interest in or purchases, e.g., using a purchase history or wish-list or both for the guest, and determines the product shown in the picture using the types of products in which the guest typically expresses interest or purchases or both.

In some implementations, the system 100 may offer to have a product delivered to a guest. For instance, the system 100 may receive an indication of a product a guest would like to purchase and generate instructions for a user interface offering to have the product delivered to the guest, e.g., while the guest is at an amusement park or a mall. The system 100 may recommend delivery at a particular location, e.g., store, restaurant, or ride, at a particular time, e.g., using reservation information, or both. The system 100 may predict a location at which the guest may be using a current location of the client device 106 and locations that the guest will be at in the future, e.g., based on reservations. The system 100 may determine a location that is on a route from the guest's current location to a future location, and provide the location as a recommended delivery location, e.g., at a time at which the guest is predicted to be at the location.

In some examples, the system 100 may determine multiple suggested delivery locations, delivery times, or both, and generate instructions for the presentation of these options to a guest. The system 100 may determine pairs of suggested delivery locations and delivery times, e.g., times at which a product would be delivered to a particular location. The system 100 provides the instructions to the client device 106 operated by the guest and, in response, receives data indicating a selection by the guest, e.g., of a location, time, or both. The system 100 facilitates delivery of the product to the guest at the selected location and time. For instance, the system 100 sends a notification or other message to a device operated by an employee, e.g., of the amusement park or mall, instructing the employee to bring the product to the guest at the particular location and time. In the example of an amusement park, the system 100 may, for instance, send a notification to a device operated by an employee of the amusement park wearing a costume of the guest's favorite cartoon character, as determined based on information stored in association with one or more user accounts held by the guest. In this way, the guest may receive the product in a memorable interaction with the guest's favorite cartoon character.

In some implementations, the system 100 may cause presentation of information on the client device 106 using wish-list information. For instance, the system 100 presents information about products on a guest's wish-list, products similar to the products on the guest's wish-list, or both. The system 100 may provide the guest with information about specials on the products or similar products, locations at which the guest may purchase the products or similar products, or both. The system 100 may use the wish-list information to inform merchandising or inventory decisions, or both, for stores in a particular location, e.g., an amusement park or a mall.

In some examples, the computing device 120, the client device 106, or a combination thereof may rely upon one or more remotely-located devices such as servers, databases, and/or cloud computing devices to perform at least a portion of the corresponding functions described herein. Such remotely-located devices may, for instance, communicate with network 110 or may communicate with the computing device 120, the client device 106, or a combination thereof over one or more other networks.

Figure 2:
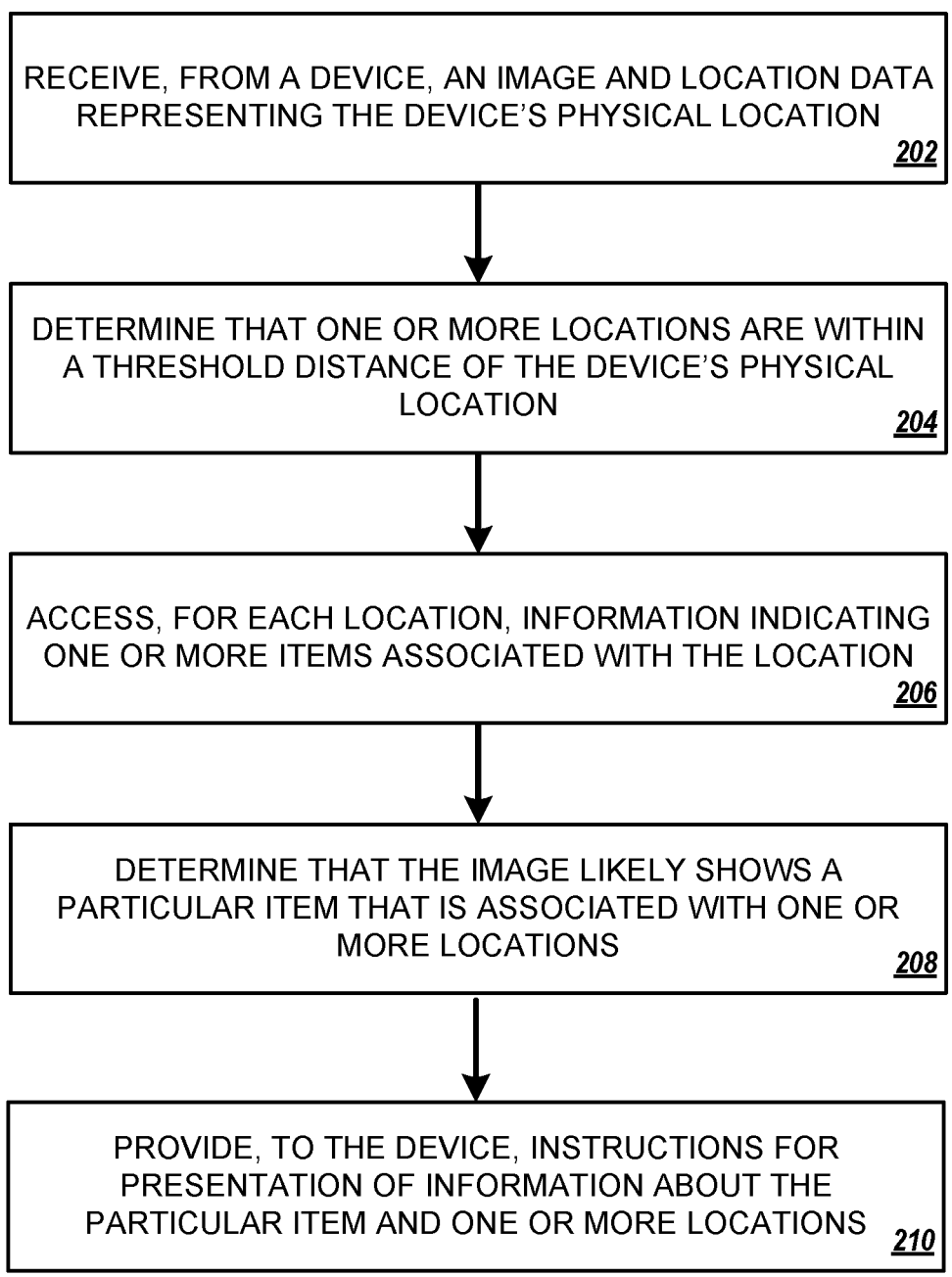
FIG. 2 is a flowchart of an example process for using location data to identify and provide services in association with items appearing in captured images.
Figure 4:
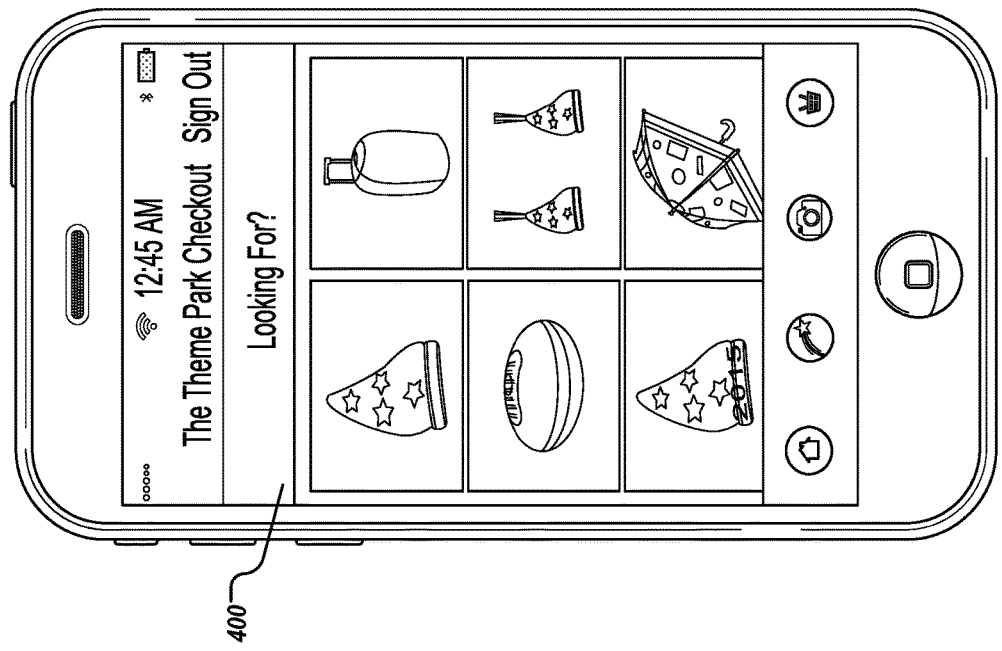
FIGS. 3-18 illustrate example user interfaces provided in an example system.
Figure 3:
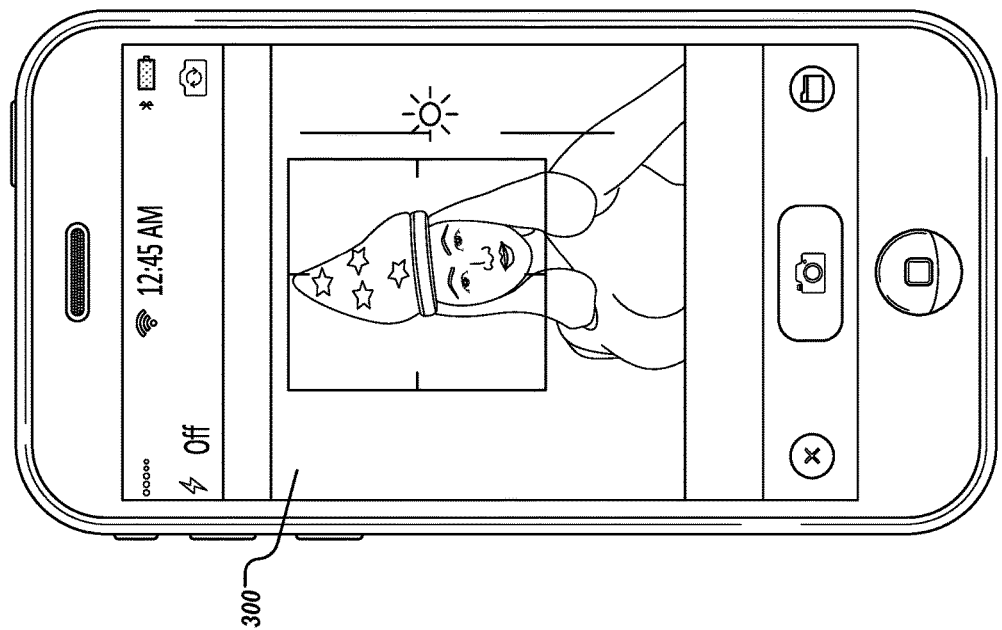
Figure 6:
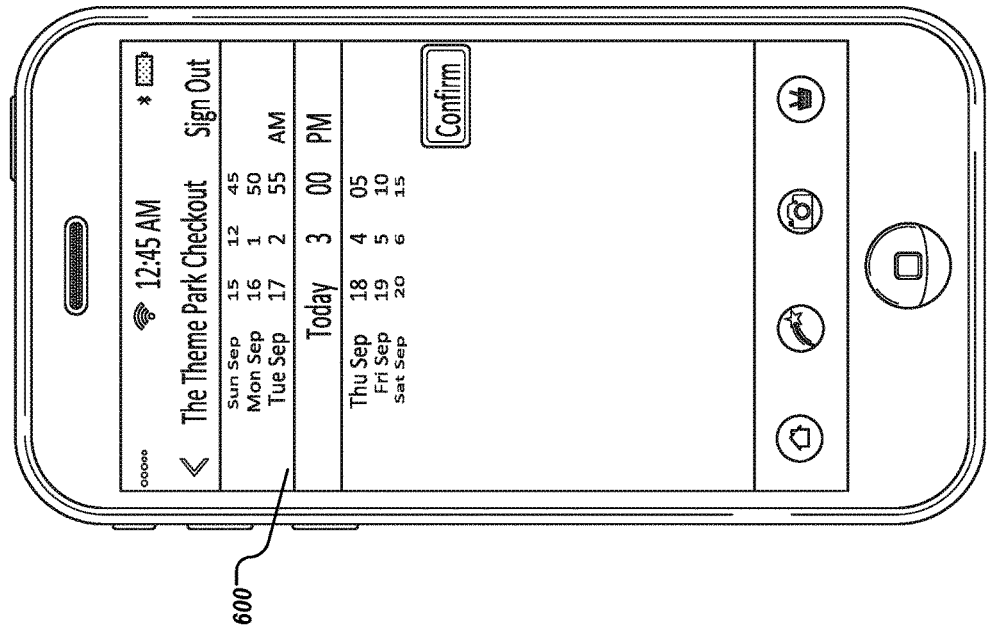
Figure 5:
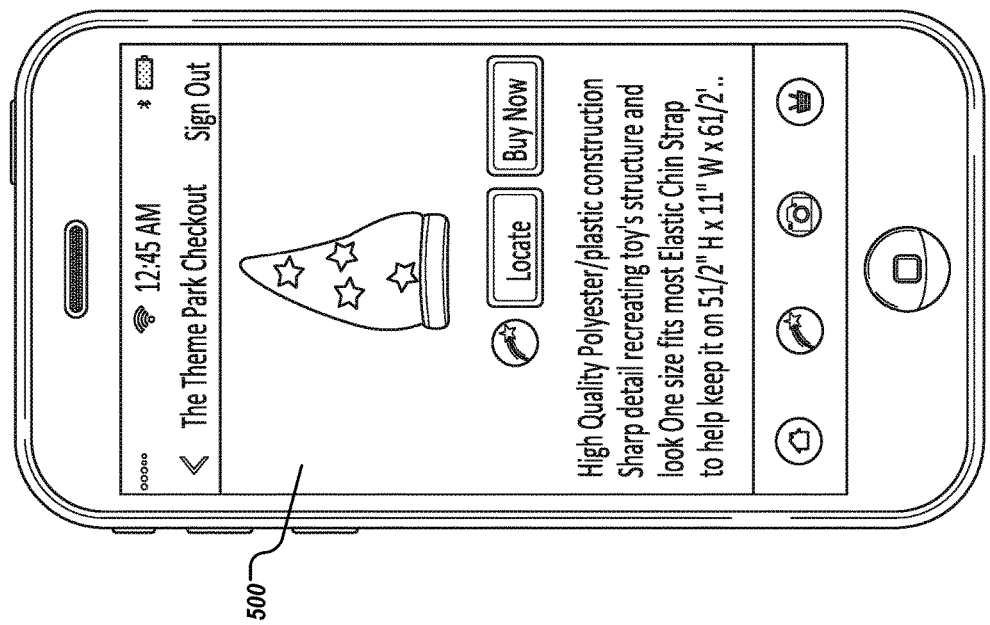
Figure 8:
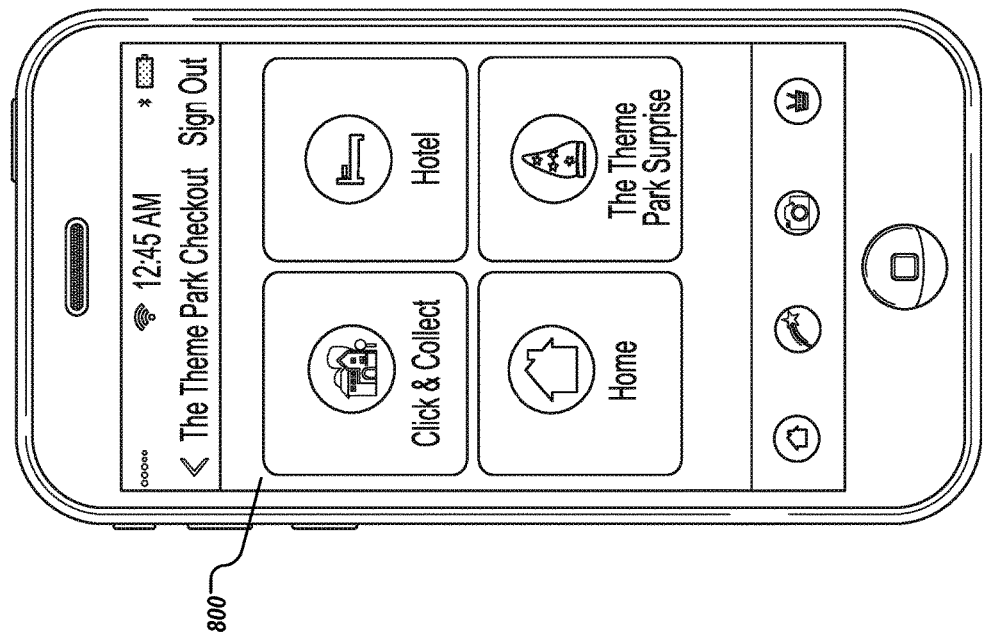
Figure 7:
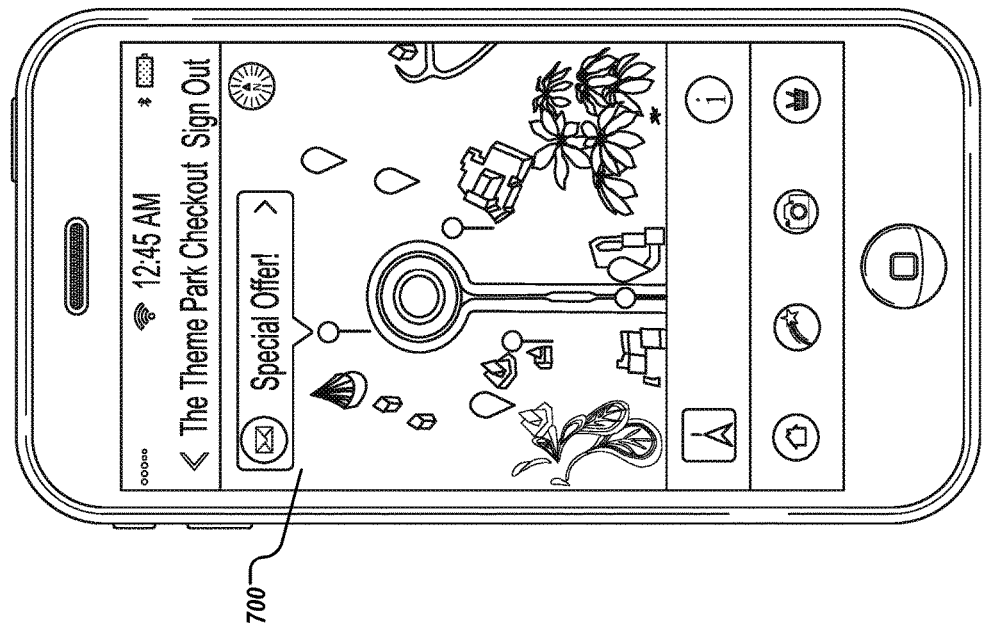
Figures 9, 10:
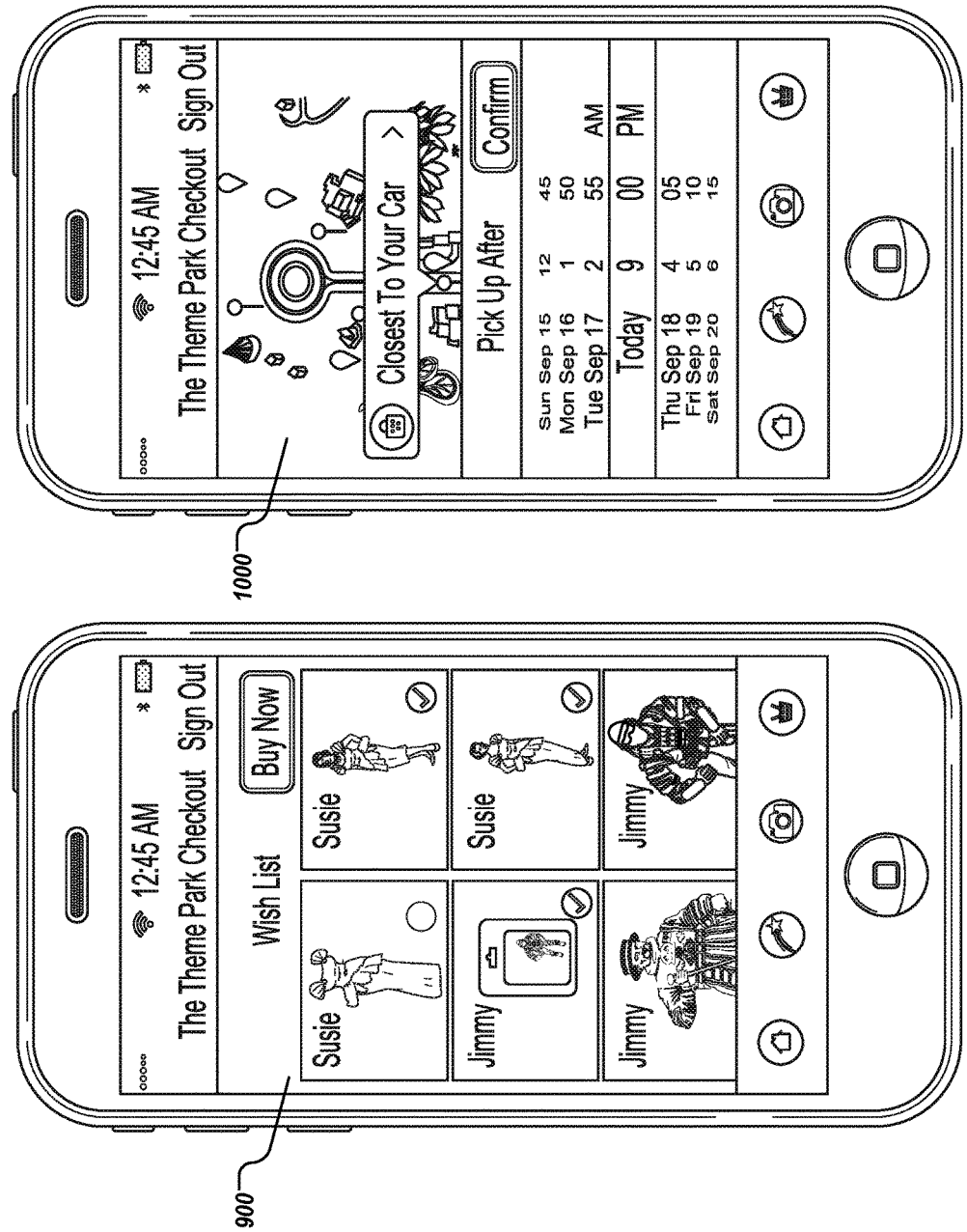
Figure 12:
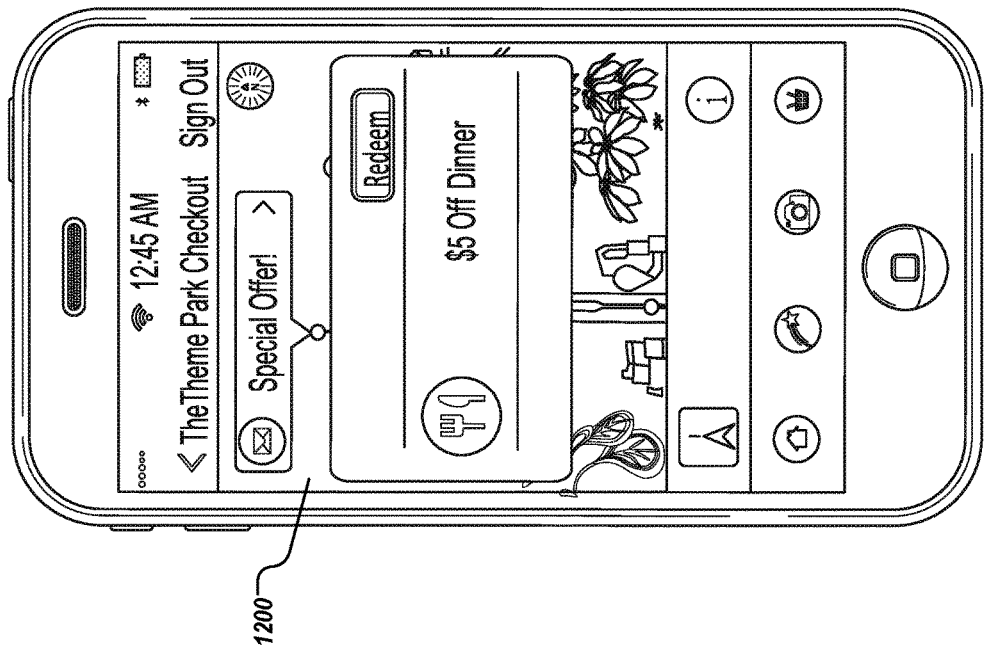
Figure 11:
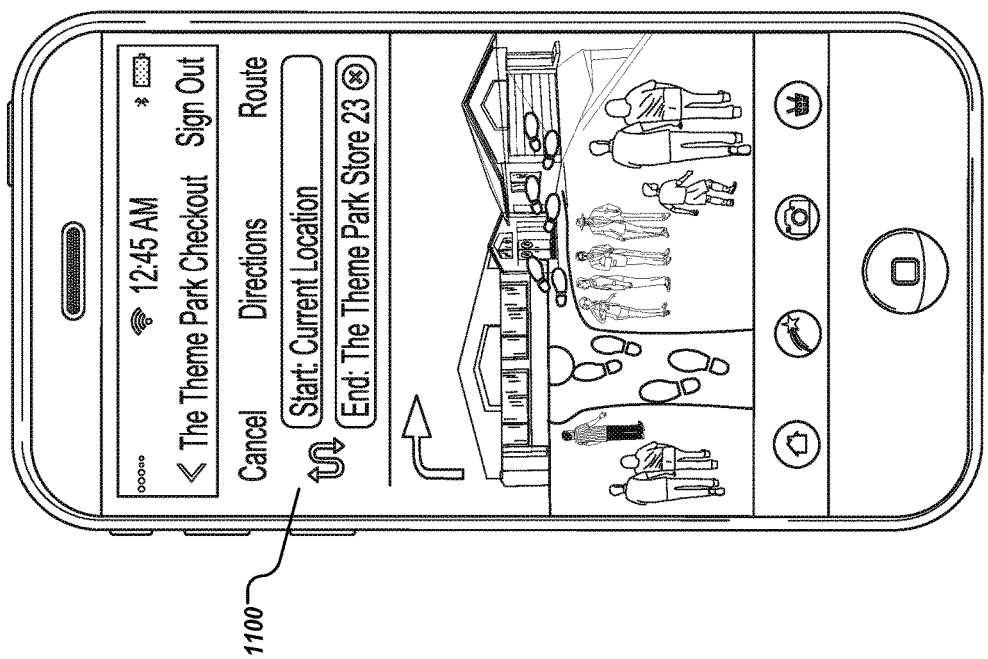
Figure 14:
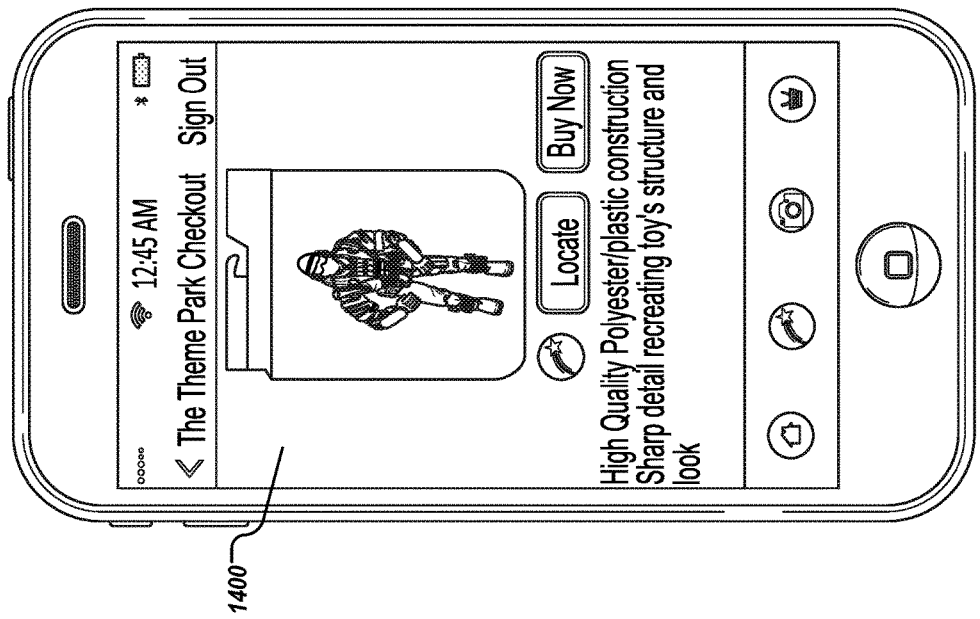
Figure 13:
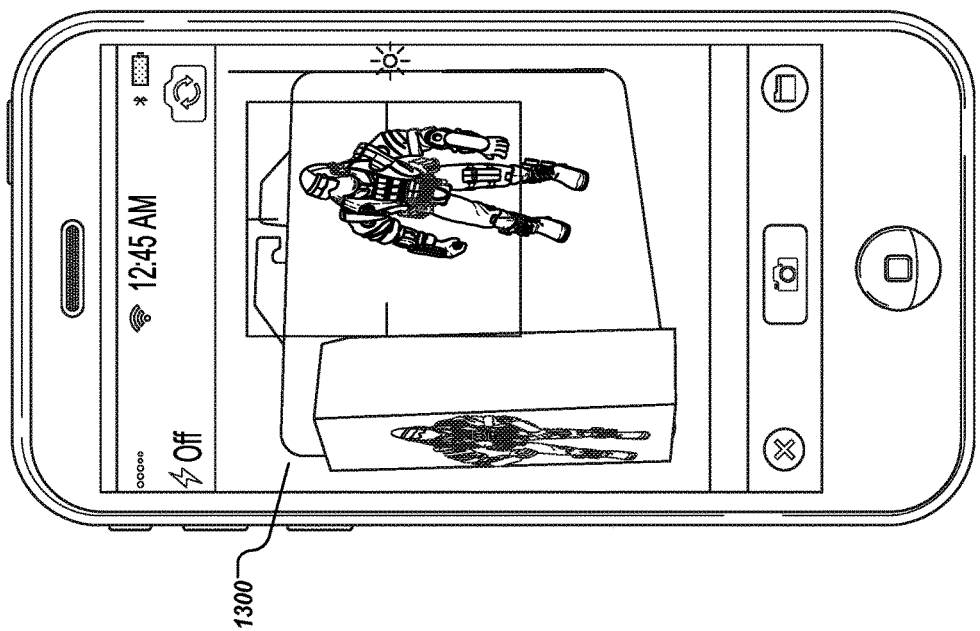
Figure 16:
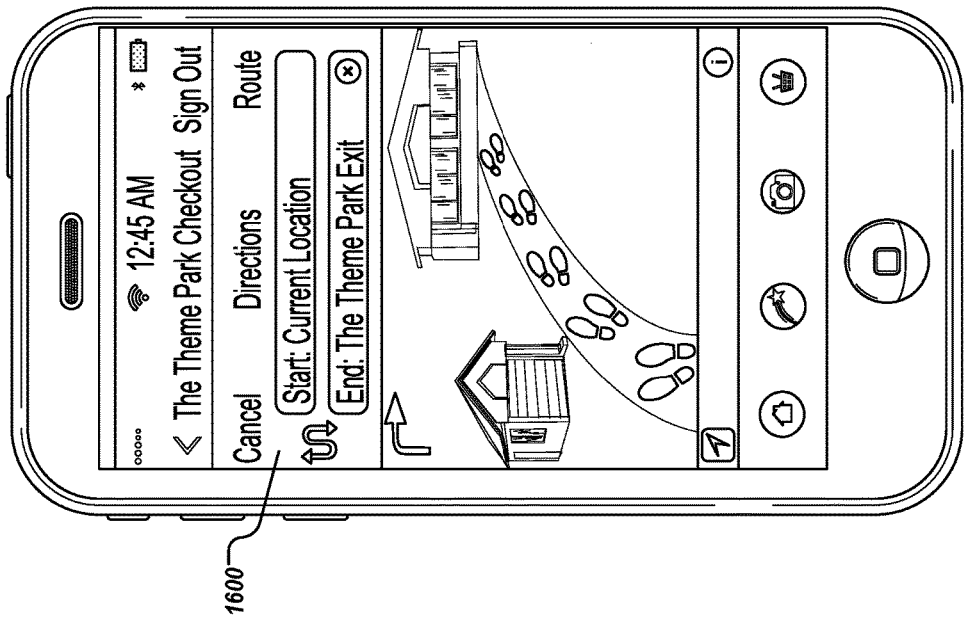
Figure 15:
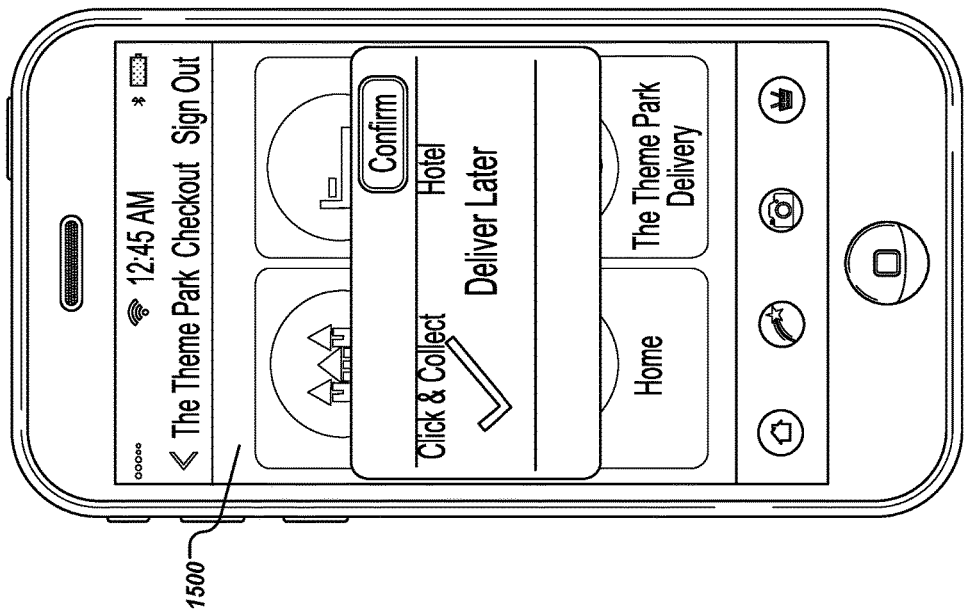
Figure 18:
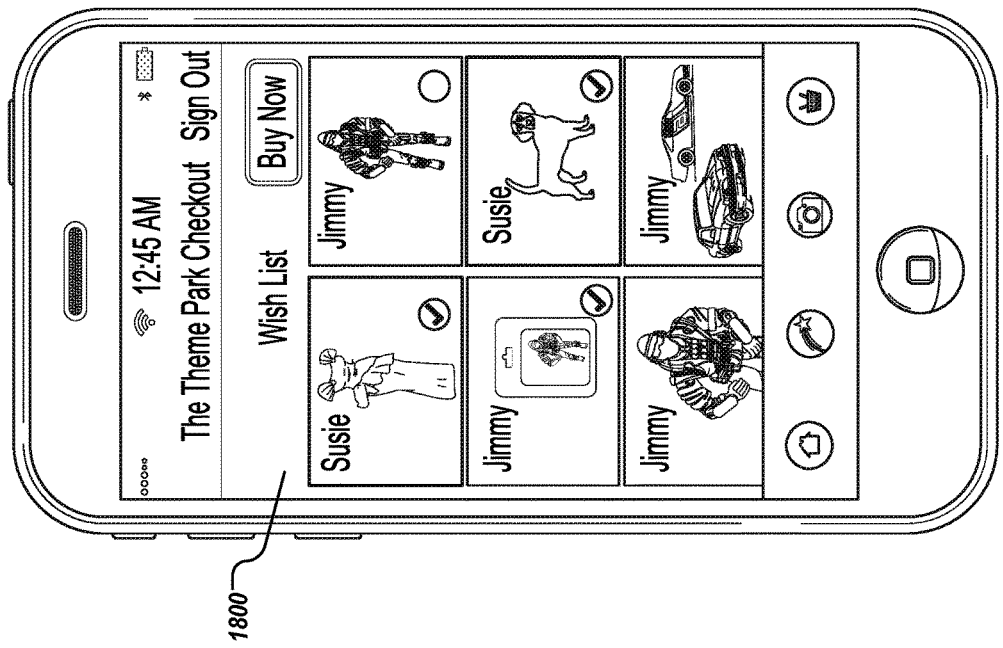

FIG. 2 is a flowchart of an example process 200 for using location data to identify an item depicted in a captured image. The following describes the process 200 as being performed by components of systems that are described with reference to FIG. 1. However, process 200 may be performed by other systems or system configurations in addition to or instead of components of the system described with reference to FIG. 1. Briefly, the process 200 may include receiving, from a device, an image and location data representing the device's physical location (202), determining that one or more locations are within a threshold distance of the device's physical location (204), accessing, for each location, information indicating one or more items associated with the location (206), determining that the image likely shows a particular item that is associated with one or more locations (208), and providing, to the device, instructions for presentation of information about the particular item and one or more locations (210).

The process 200 may include receiving, from a device, an image and location data representing the device's physical location (202). This may, for instance, correspond to the computing device 120, as described above in reference to FIG. 1, receiving, from the client device 106, the image 111 and location data 112 representing the physical location 104 of the client device 106.

The process 200 may include determining, based on the location data, that a particular set of one or more locations are within a threshold distance of the device's physical location (204). For example, this may correspond to the POI locator module 122 of the computing device 120, as described above in reference to FIG. 1, determining, based on the location data 112, that a particular set of physical locations corresponding to predefined points of interest, as identified in information stored in one or more databases that are maintained by or otherwise accessible to the computing device 120, are within a threshold distance of physical location 104 of the client device 106.

The process 200 may include accessing, for each of the one or more locations in the particular set, item information that indicates one or more items that are associated with the location (206). Such item information may, for instance, indicate one or more items that are designated as being eligible for retrieval at the location. In some implementations, accessing, for each of the one or more locations in the particular set, item information that indicates one or more items that are associated with the location may include accessing, for each of the one or more locations in the particular set, an inventory of items at the location or a catalog of one or more items that are designated as being eligible for retrieval at the location. This may, for instance, correspond to the catalog selection module 124 of the computing device 120, as described above in reference to FIG. 1, accessing or obtaining item information, such as one or more product catalogs and inventory lists stored in one or more databases that are maintained by or otherwise accessible to the computing device 120, for each of the one or more predefined points of interest having been determined by the POI locator module 122.

The process 200 may include determining, based on the accessed item information, that the image likely shows a particular item that is associated with one or more locations in the particular set (208). In some examples, this may include determining, based on the accessed item information, that the image likely shows a particular item that is designated as being eligible for retrieval at one or more locations in the particular set. For instance, this may correspond to the item identification module 126 of the computing device 120, as described above in reference to FIG. 1, determining that the image 111 likely shows a particular item, such as a Wizard's Hat, from among the multiple, different items identified in the item information accessed by the catalog selection module 124 and associated with the one or more of the predefined points of interest having been identified by the POI locator module 122. Examples of such points of interest may, for instance, include a store located near physical location 104, e.g., less than a threshold distance from physical location 104, that currently has the Wizard's Hat in stock, and a nearby cotton candy stand that is a designated item drop-off point for a distribution center for the venue that currently has the Wizard's Hat in stock.

The process 200 may include providing, to the device, instructions for presentation of information about (i) the particular item and (ii) one or more locations in the particular set that are associated with the particular item (210). This may, for instance, correspond to the computing device 120, as described above in reference to FIG. 1, providing the presentation instructions 130 to the client device 106 that, when used by the client device 106, cause the client device 106 to display one or more user interface screens, such as user interface 108e, that convey information about one or more items identified as likely appearing in the image 111 and the locations of one or more points of interest at which such one or more items may be made available for purchase or pick up.

In some implementations, the process 200 may further include determining, for each of the one or more locations associated with the particular item, a predicted amount of time that a task of retrieving one or more items at the location would take, ranking the one or more locations associated with the particular item based on the predicted amounts of time, and generating a set of instructions for presentation of information about (i) the particular item and (ii) one or more locations in the particular set, ordered based on the ranking, that are associated with the particular item. In these implementations, providing, to the device, instructions for presentation of information about (i) the particular item and (ii) one or more locations in the particular set that are associated with the particular item may, for instance, include providing the generated set of instructions to the device. For instance, this may correspond to the presentation instruction generator 128 of computing device 120, as described above in reference to FIG. 1, determining estimated wait times for points of interest at which the Wizard's Hat is retrievable, e.g., stores, kiosks, drop-off points, etc., and generating presentation instructions 130 that instruct the client device 106 to display a list of different points of interest at which the Wizard's Hat may be obtained in an order determined based on the estimated wait times. Such a wait time may, for instance, correspond to the estimated amount of time that one may spend waiting in line to retrieve the item, e.g., within a line of people waiting to purchase one or more items at a store checkout, correspond to the estimated amount of time that it may take venue personnel or a robotic device to retrieve and deliver the item to the point of interest, or both.

For example, determining, for each of the one or more locations associated with the particular item, a predicted amount of time that a task of retrieving one or more items at the location would take may, in some of these implementations, include determining, for a first location associated with the particular item, a first predicted amount of time that a task of retrieving one or more items at the first location is predicted to take, and determining, for a second location associated with the particular item, a second predicted amount of time that a task of retrieving one or more items at the second location is predicted to take. In this example, the process 200 may further include determining that the first predicted amount of time is less than the second predicted amount of time and, in this example, ranking the one or more locations associated with the particular item based on the predicted amounts of time may include ranking the one or more locations associated with the particular item based on determining that the first predicted amount of time is less than the second predicted amount of time. This may, for instance, correspond to the presentation instruction generator 128 of computing device 120, as described above in reference to FIG. 1, determining estimated wait times for points of interest that at which the Wizard's Hat is retrievable, and generating presentation instructions 130 that instruct the client device 106 to display an ordered list of different points of interest at which the Wizard's Hat may be obtained, e.g., ranked from shortest to longest corresponding estimated wait time. In this example, ranking the one or more locations associated with the particular item based on determining that the first predicted amount of time is less than the second predicted amount of time may, in some instances, include assigning the first location a higher ranking than the second location based on determining that the first predicted amount of time is less than the second predicted amount of time.

In some implementations, the process 200 may include determining, based on the location data, that the device is located a first distance away from the first location, determining, based on the location data, that the device is located a second distance away from the second location, determining that the first distance is greater than the second distance, and based on determining that the first predicted amount of time is less than the second predicted amount of time and determining that the first distance is greater than the second distance, determining an incentive that is to be provided for retrieving the particular item at the first location. Providing the generated set of instructions to the device may, for example, include providing, to the device, instructions for presentation of information about (a) the particular item, (b) the first location, (c) the second location, and (d) the determined incentive. This may, for example, correspond to one or more components of system 100, such as the presentation instruction generator 128 described above in reference to FIG. 1, generating a five dollar coupon, e.g., for a restaurant, and providing instructions for presentation of a recommendation to retrieve the Wizard's Hat from a location other than the location that is closest to the physical location 104 to receive the coupon. The process 200 may, in some examples, further include, at a particular time after providing the instructions for presentation of information to the device, receiving, from the device, updated location data representing the device's physical location at the particular time, determining, based on the updated location data, that the device is at the first location, and in response to providing the instructions for presentation of information to the device and determining that the device is at the first location, providing, to the device, instructions for presentation of one or more graphical or textual elements indicating an offer to redeem the determined incentive. In this way, coupons and other incentives may be redeemed by traveling to the recommended location.

In some implementations, the process 200 may further include determining, based on the location data, that a first set of one or more locations are within a first threshold distance of the device's physical location, accessing, for each of the one or more locations in the first set, item information that indicates one or more items that are associated with the location, determining, based on the accessed item information for the one or more locations in the first set, that the image does not satisfy a threshold likelihood for any of the one or more items that are associated with the one or more locations in the first set, and in response to determining that the image does not show any of the one or more items that are associated with the one or more locations in the first set, identifying a second threshold distance that is greater than the first threshold distance. In these implementations, determining, based on the location data, that the particular set of one or more locations are within the threshold distance of the device's physical location may include, after identifying the second threshold distance, determining, based on the location data, that a second set of one or more locations are within the second threshold distance of the device's physical location, the second set of one or more locations being different from the first set of one or more locations. For instance, this may allow one or more components of the system to conserve resources by limiting the size of the point of interest search space, the size of the image catalog, or both.

In some examples, the process 200 may further include determining, based on the location data, that the device is located within a geographic region that is occupied by a particular venue or park, e.g., an amusement park, concert hall, festival grounds, sports stadium, a shopping mall, or another area with multiple shops and/or kiosks, e.g., that carry the same product. In such examples, determining, based on the location data, that the particular set of one or more locations are within the threshold distance of the device's physical location may, for instance, include determining, based on the location data, that the particular set of one or more locations are (i) within the threshold distance of the device's physical location, and (ii) positioned within the geographic region that is occupied by the particular venue or park.

In these examples, the process 200 may, in some instances, further include determining that the device is associated with a particular user, accessing user information indicating one or more characteristics of the particular user and the particular user's visit to the particular venue or park, and based on the one or more characteristics of the particular user's visit to the particular venue or park, generating a set of instructions for presentation of information about (i) the particular item and (ii) one or more locations in the particular set that are associated with the particular item. In such instances, providing, to the device, instructions for presentation of information about (i) the particular item and (ii) one or more locations in the particular set that are associated with the particular item may include providing the generated set of instructions to the device. This may, for instance, correspond to the presentation instruction generator 128 of computing device 120, as described above in reference to FIG. 1, generating presentation instructions 130 based on user information, e.g., user preferences, browsing history, social media activity, venue ticketing and admissions information, travel itineraries, purchasing history, and other data associated with the client device 106 or one or more accounts having been accessed on the client device 106. That is, the presentation instruction generator 128 of computing device 120 may generate presentation instructions 130 that indicate one or more locations having been ranked and/or provided as a recommendation based on such user information.

In some implementations, the process 200 may, in such instances, further include identifying, based on the accessed user information, one or more additional locations that are different from the particular set of locations. In these implementations, generating the set of instructions may include generating a set of instructions for presentation of information about (i) the particular item, (ii) one or more locations in the particular set that are associated with the particular item, and (iii) the identified one or more additional locations. At least some of the identified one or more additional locations may, in some of these implementations, be located outside of the geographic region that is occupied by the particular venue or park. For example, this may correspond to the computing device 120, as described above in reference to FIG. 1, further identifying locations outside of the amusement park to which the Wizard's Hat may be delivered. Such locations may, for instance, include the residence of one or more users associated with the client device 106 or an offsite hotel at which such one or more users are staying before, after, or during their visit to the amusement park; one or more locations within a parking lot or garage at which at least one vehicle of such one or more users; an airport or train station used by such one or more users in traveling to or from the amusement park; and the like.

In some of these instances, the process 200 may further include identifying, based on the accessed user information, one or more employees of the particular venue or park, and while or after providing the generated set of instructions to the device, providing, to one or more devices that are associated with the identified one or more employees of the particular venue or park, instructions for presentation of a notification about the particular item. In this way, one or more notifications or other messages may be provided to devices associated with specific employees of the venue so as to instruct the specific employees to perform one or more tasks to facilitate or enhance item retrieval by the particular user. For example, one or more notifications may be provided to a device associated with a specific employee of an amusement park whose role at the amusement park includes wearing a genie costume to request that the specific employee deliver an item to a guest associated with user information indicating that the guest's favorite movie character is a genie.

In some implementations, the process 200 may further include, for each item that is associated with one or more locations in the particular set, accessing, based on the accessed item information, imaging data that is associated with the item, and evaluating the image against the accessed imaging data. In such implementations, determining, based on the accessed item information, that the image likely shows the particular item that is associated with one or more locations in the particular set may, for instance, include determining, based on evaluating the image against the accessed imaging data, that the image likely shows a particular item that is associated with one or more locations in the particular set. For example, this may correspond to the item identification module 126 of computing device 120, as described above in reference to FIG. 1, accessing one or more images, templates, or other representations of each item indicated in the item information obtained by the catalog selection module 124, and performing one or more image recognition processes to determine the degree to which the image 111 conforms to imaging data for known items.

In some examples, after providing, to the device, instructions for presentation of information about (i) the particular item and (ii) one or more locations in the particular set that are associated with the particular item, the process 200 may further include receiving, from the device, data indicating a user selection of a particular one of the one or more locations indicated in the instructions, and in response to receiving data indicating the user selection of the particular location, providing, to one or more devices that are associated with the particular location, instructions for presentation of a notification about the particular item. For instance, one or more notifications or other messages may be provided to devices associated with a store having been selected as the location at which one or more users will retrieve the particular item, so that store personnel may, for example, set aside the particular item, giftwrap the particular item, prepare to receive a delivery of the particular item from a robotic device or other personnel, and the like.

In some implementations, the process 200 may further include, in response to determining that the image likely shows the particular item that is associated with one or more locations in the particular set, accessing attribute information indicating one or more physical attributes of the particular item, ranking the one or more locations associated with the particular item based on the one or more physical attributes of the particular item, and generating a set of instructions for presentation of information about (i) the particular item and (ii) one or more locations in the particular set, ordered based on the ranking, that are associated with the particular item. In such implementations, providing, to the device, instructions for presentation of information about (i) the particular item and (ii) one or more locations in the particular set that are associated with the particular item may include providing the generated set of instructions to the device. Examples of such attributes may include weight, dimensions, value, estimated shelf life, fragility, and the like. For instance, one or more components of the system 100 described above in reference to FIG. 1, such as the presentation instruction module 128 of computing device 120, may rank locations based on the weight of items such that, for relatively heavy items, locations that are closer to park exits higher than those that are farther from park exits. In this way, a user may haul a heavy item they have purchased as short of a distance as possible. Similarly, for items that are relatively high in value, one or more components of the system 100 may rank locations that are relatively safe and secure, e.g., as indicated by crime statistics, presence of venue personnel, etc., higher than locations that are not relatively safe or secure.

In some examples, before providing, to the device, instructions for presentation of information about (i) the particular item and (ii) one or more locations in the particular set that are associated with the particular item, the process 200 may include generating a first set of instructions for presentation of information about (i) a set of one or more items and (ii) one or more locations that are associated with the set of one or more items, and providing the first set of instructions to another, different device. In addition, the process 200 may, in these examples, further include, based on providing the first set of instructions to the other, different device, generating a second set of instructions for presentation of information about (i) the particular item and (ii) one or more locations in the particular set that are associated with the particular item. In such examples, providing, to the device, instructions for presentation of information about (i) the particular item and (ii) one or more locations in the particular set that are associated with the particular item may, for instance, include providing the second set of instructions to the device. This may, for instance, correspond to the computing device 120 of system 100, as described above in reference to FIG. 1, using analytics to distribute guests throughout a venue, e.g., an amusement park, concert hall, sports stadium, a shopping mall, or another area with multiple shops and/or kiosks that carry the same product, to reduce the likelihood that a particular physical location will become extremely crowded and have long checkout wait times, e.g., compared to other stores with the same or similar products in nearby locations. That is, instructions for presentation that are provided to each of multiple, different client devices that communicate with the computing device 120, e.g., client devices being used by multiple, different guests at an amusement park, may be generated at least in part based on instructions for presentation already having been provided other devices. The other, different device may be operated by a first guest from the multiple, different guests and the device may be operated by a second guest from the multiple, different guests such that the first guest is a different guest than the second guest.

In these examples, the process 200 may, in some instances, further include ranking the one or more locations associated with the particular item based on providing the first set of instructions to the other, different device. In such instances, generating the second set of instructions for presentation of information about (i) the particular item and (ii) one or more locations in the particular set that are associated with the particular item may include generating a second set of instructions for presentation of information about (i) the particular item and (ii) one or more locations in the particular set, ordered based on the ranking, that are associated with the particular item. For example, this may correspond to the computing device 120 of system 100, as described above in reference to FIG. 1, providing, to multiple, different client devices, instructions for presentation of location recommendations that are varied to decrease the likelihood that any given location is recommended to a disproportionate number of guests within a relatively short timeframe. As such, providing instructions to client devices in this manner may serve to also decrease the likelihood that a particular physical location will become extremely crowded and have long checkout wait times.

FIGS. 3-18 illustrate example user interfaces 300-1800 for finding products, locations at which to purchase products, times at which to purchase products or have products delivered, incentives for purchasing products at a location that is not the closest location to a guest, and wish-lists for products. Example user interfaces 300-1800 may, for instance, be provided by components of systems that are described with reference to FIG. 1, such as the client device 106, and in association with process 200, as described above in reference to FIG. 2.

Figure 17:
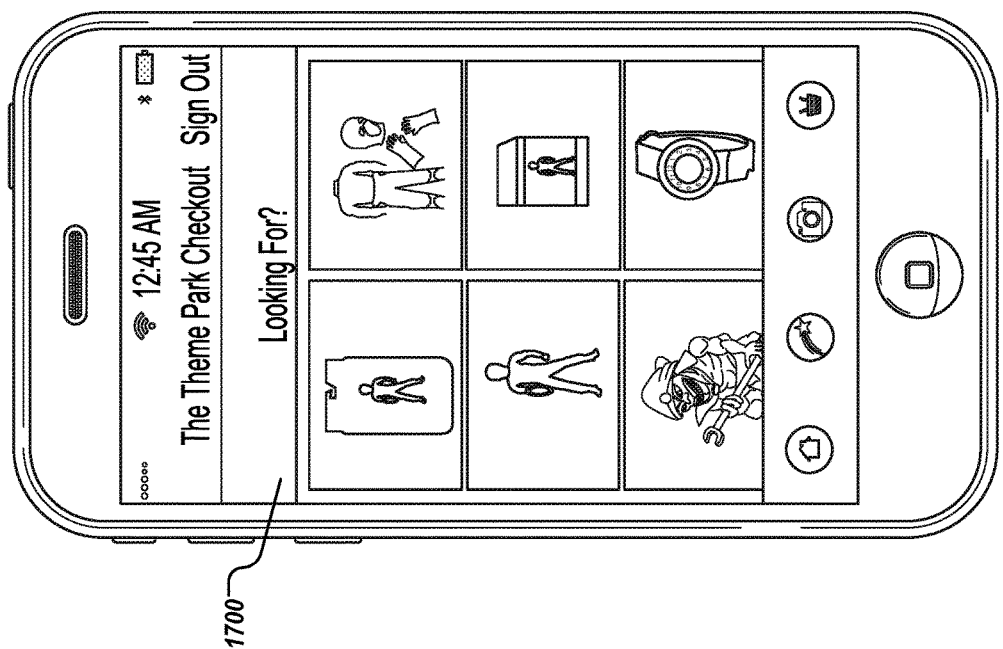
Figure 19:
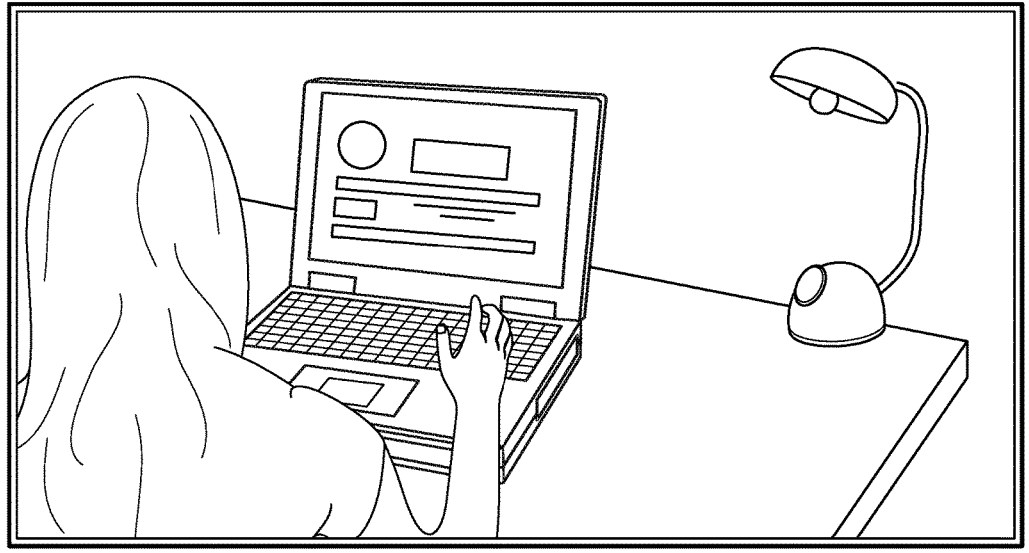
FIGS. 19-37 illustrate examples of user interactions with an example system.

FIGS. 19-37 illustrate examples of user interactions with a system. For example, FIG. 17 illustrates guest interactions with the system prior to a trip to an amusement park or a mall. The system may receive indication of products in which a guest, or a group of guests, such as a family, are likely to be interested. The system may receive identification of tags for products in which the guest is likely to be interested.

Figure 20:
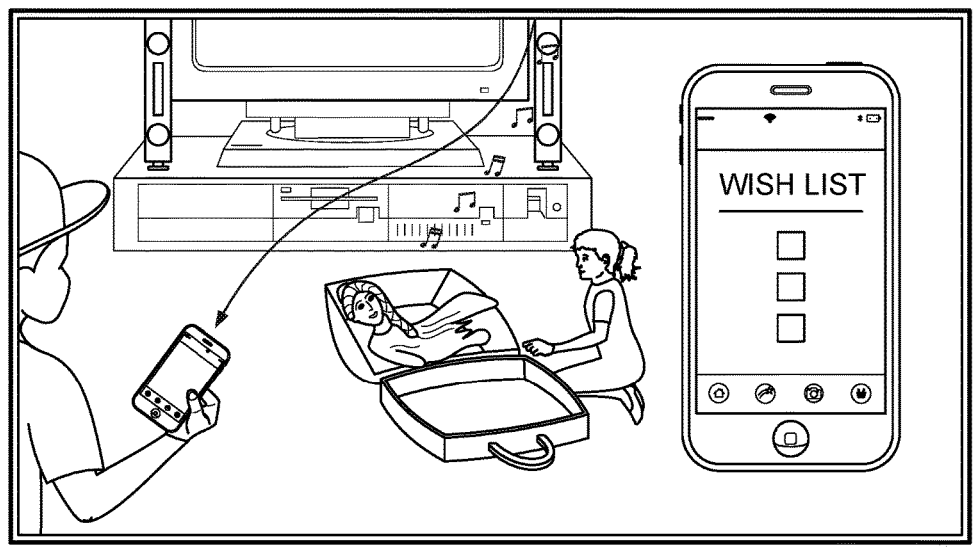

In some implementations, the system may create a profile for a guest, or a group of guests, based on guest interactions with other systems. For instance, as shown in FIG. 20, the system may provide an application to a device operated by a guest, e.g., in response to a guest request to install the application on the device. Once installed on the device, the application may monitor shows, movies, games, or other content with which the guest interacts and provide information about the content to the system. The system may use the information about the content to predict products or types of products the guest may purchase, e.g., when the guest visits a particular mall or amusement park. The system may update a wish-list for the guest or the group of guests with information about the predicted products.

Figure 21:
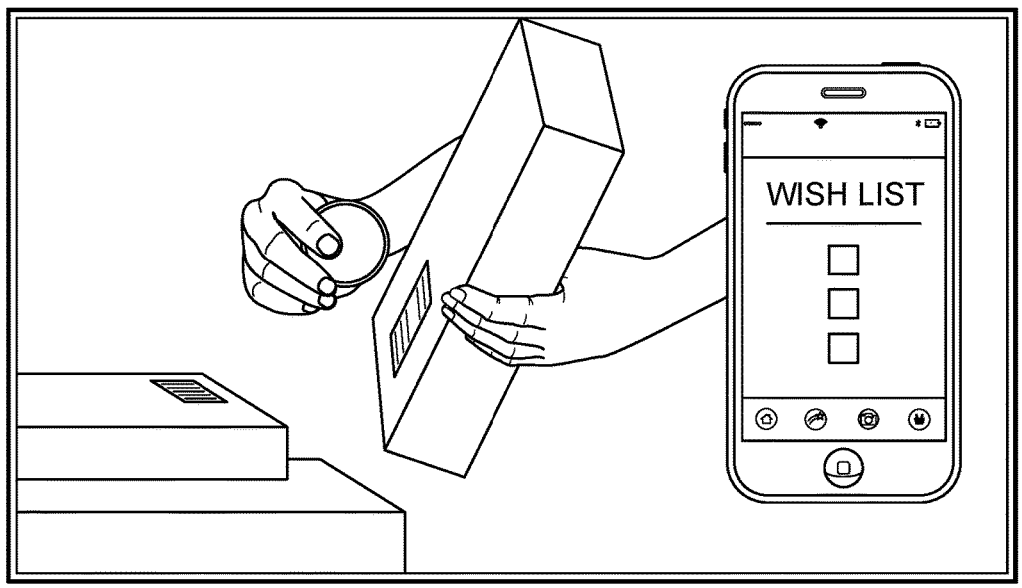

FIG. 21 illustrates an example in which a device receives data about products in which a guest is likely interested. For example, the guest may use the device to scan codes on the products. The device sends data about the products and the guest to a system, and the system updates a wish-list for the guest, or a group or guests, e.g., the guest's family, to include the products.

Figure 22:
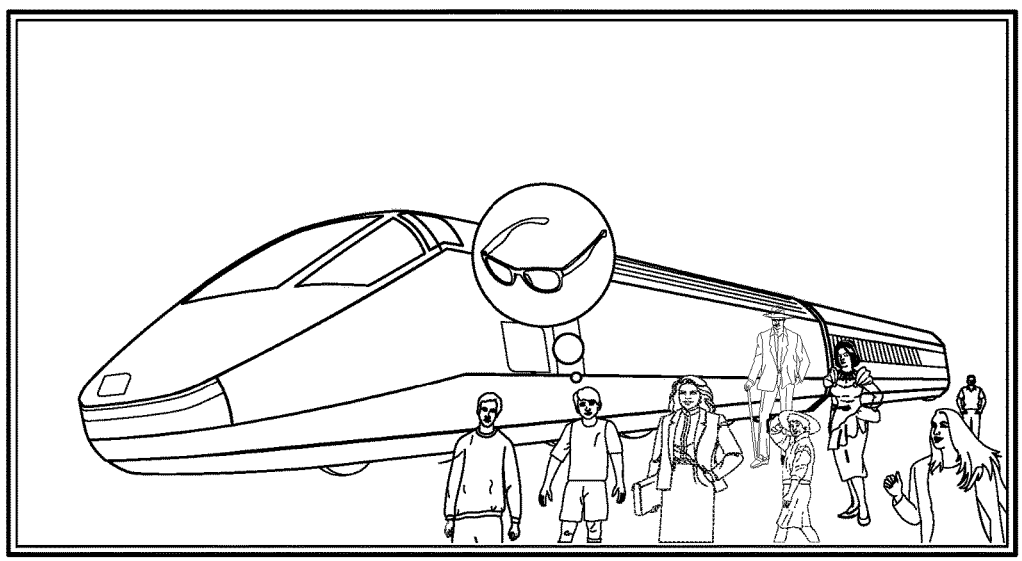
Figure 23:
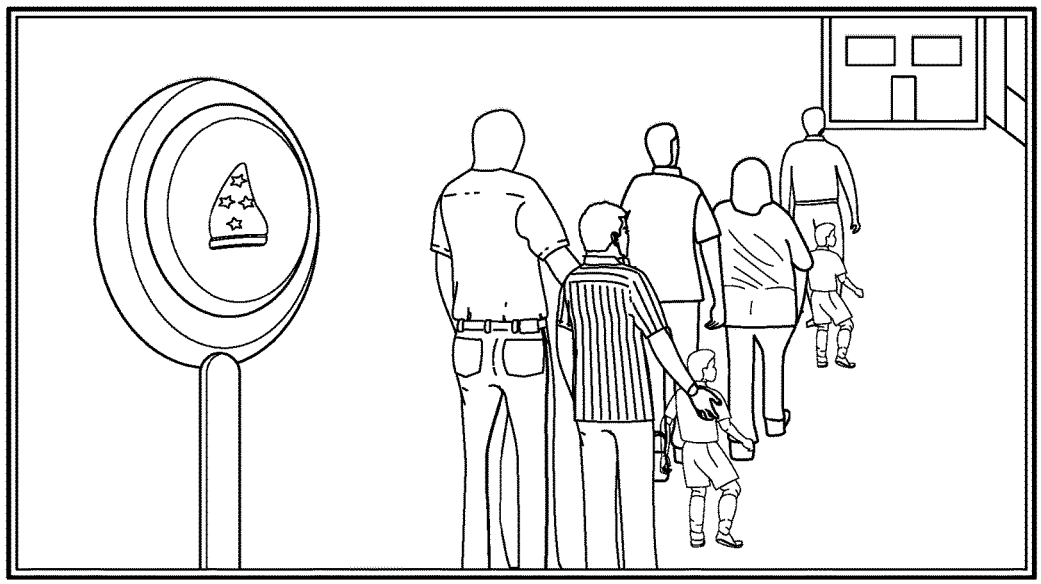
Figure 24:
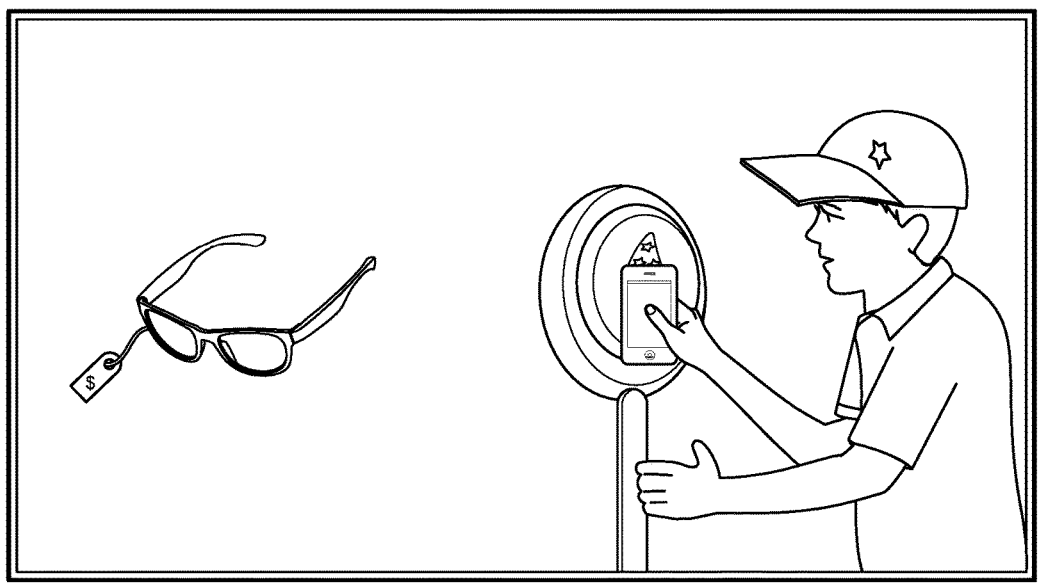

In some implementations, the system may facilitate self-checkout. For instance, as shown in FIG. 22, when a guest realizes that he lost his sunglasses, the system may determine a location near the guest at which the guest may purchase a new pair of sunglasses and provide information about the location to a device operated by the guest, e.g., in response to a request for a location at which to purchase sunglasses. When the checkout line at the location is long, as shown in FIG. 23, the system may facilitate payment for the new pair of sunglasses using a contactless payment system. For example, as shown in FIG. 24, the system may allow the guest to purchase the new pair of sunglasses with an application installed on a device operated by the guest or at a self-checkout device in a store.

Figure 25:
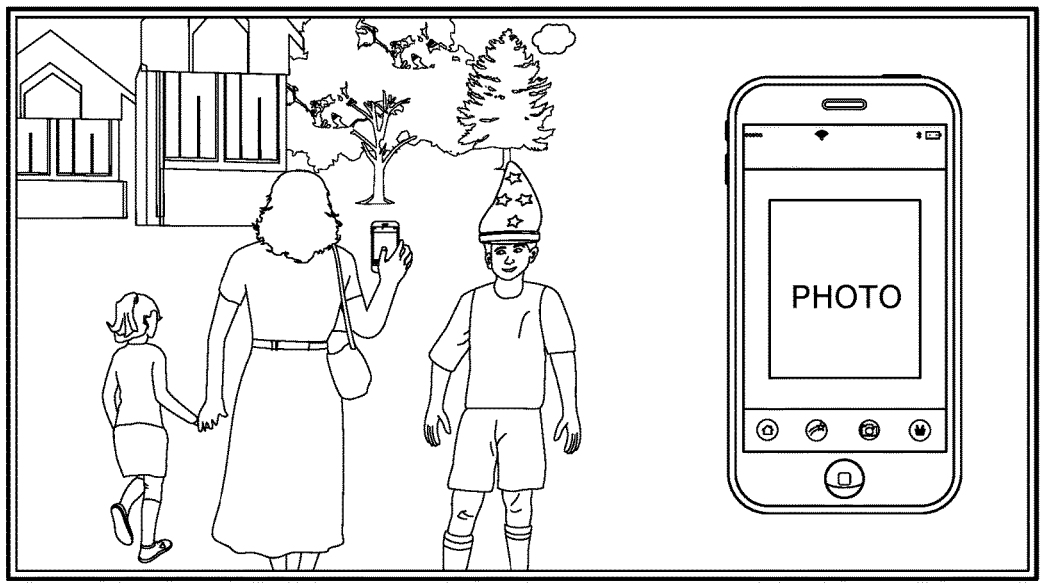

FIG. 25 illustrates an example of a system assisting a guest in finding a location at which to purchase a product. The system may, for example, leverage one or more of the techniques described above in reference to FIGS. 1 and 2 to perform or enable the performance of one or more of the operations described in reference to FIGS. 25-29. For instance, when a guest sees a product that they like, a device operated by the guest takes a picture of the product, e.g., in response to input from the guest. An application executing on the device submits the picture to the system. The system receives the picture and analyzes the picture to determine the product included in the picture.

The device may receive information about the determined product and present the information to the guest. The user interface with information about the product may include a buy it now option that allows the guest to request directions to a location at which the guest may purchase the product or a website at which the guest may purchase the product.

Figure 26:
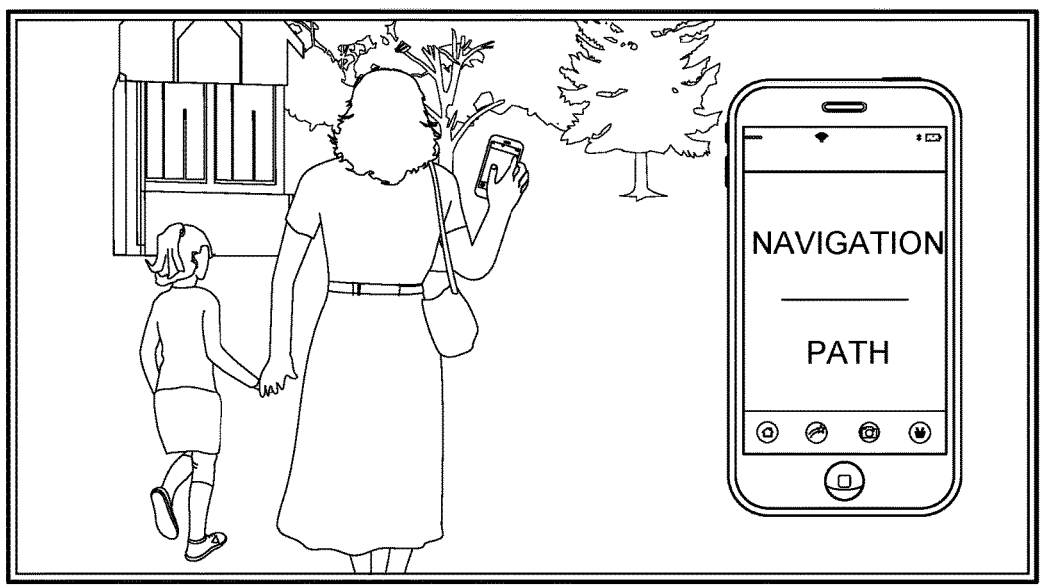

The system may determine a location at which the guest may purchase the product, e.g., a closest location or a location predicted to have a short checkout wait time or fewer guests than other locations nearby. For instance, the system may determine directions for the guest to get to a store to distribute different guests to different stores in a particular area, e.g., a mall or an amusement park. The system determines directions from the guest's current location to the location at which the guest may purchase the product and provides instructions for presentation of the directions to the device. The device, as shown in FIG. 26, presents the directions to the guest. In some examples, the device may present the directions to the guest in response to receiving a selection from the guest of a buy it now option.

Figure 27:
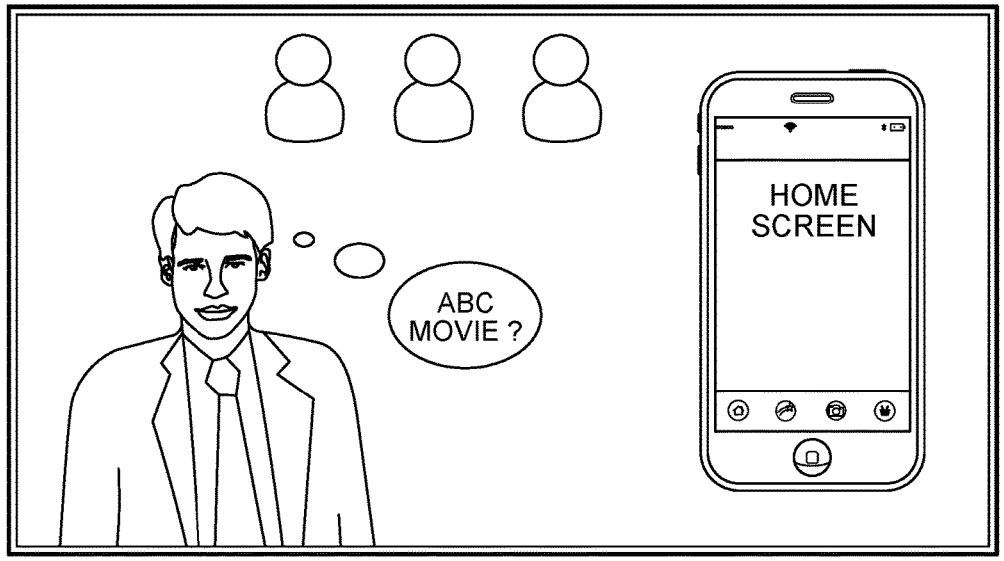
Figure 28:
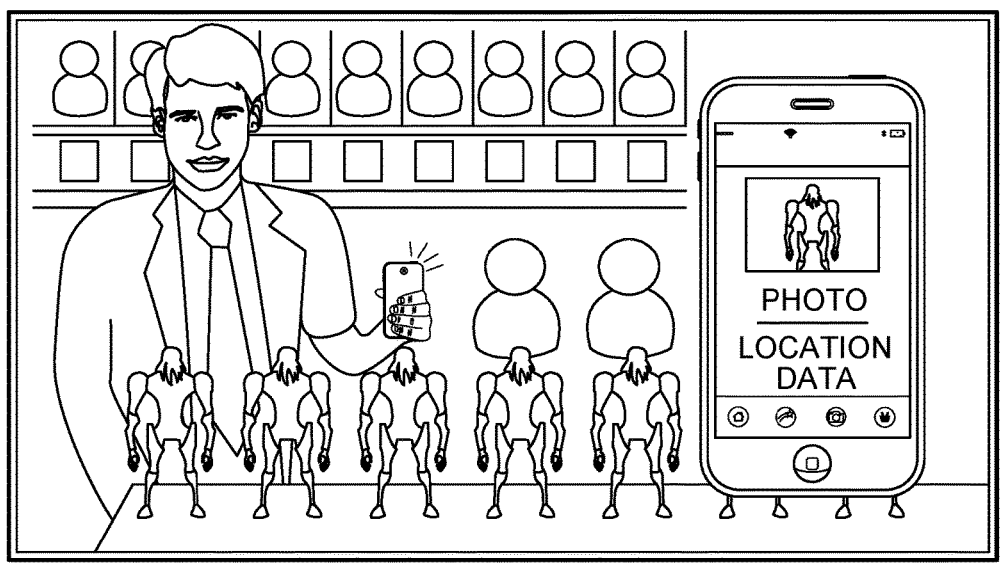
Figure 29:

FIGS. 27-29 illustrate an example of a system determining a product using a picture of the product and facilitating delivery of the product at a later time. For instance, a guest may determine that a new movie, "ABC movie," is coming out in a couple of months. The guest uses a device, such as a smart phone, to take a picture of an action figure for the new movie. The device submits the picture to a system and the system uses the picture to determine the action figure shown in the picture. The system may use a physical location of the device to narrow search results, e.g., by using product catalogs for stores located in physical locations near the physical location of the device.

The system generates instructions for presentation of information about the action figure and options to allow the guest to purchase the product. One of the options to purchase the product may include a deliver later option that allows the guest to purchase the product and have the product delivered at a later time, e.g., when the guest is no longer at the mall or amusement park. In some examples, the system may deliver the action figure before opening night of the movie so that the guest, or a person whom is receiving the action figure, may bring the action figure to the movie with them.

Figure 30:
Figure 31:
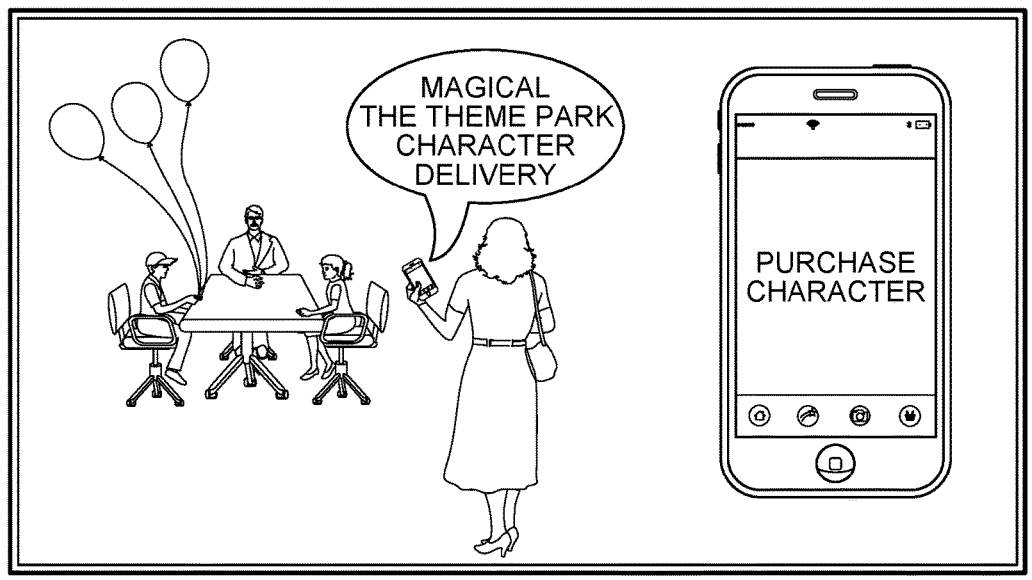
Figure 32:
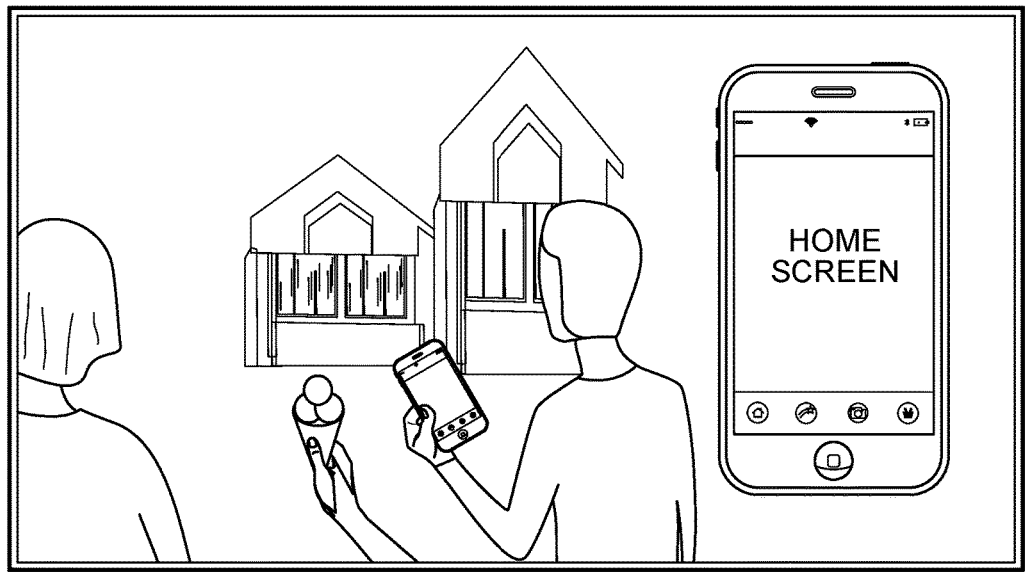
Figure 33:
Figure 34:
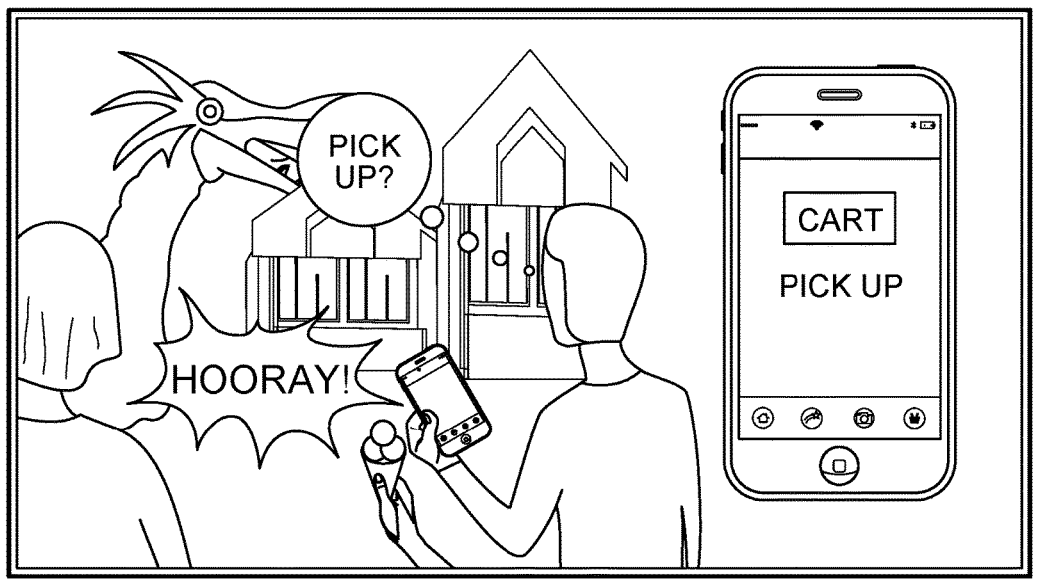
Figure 35:
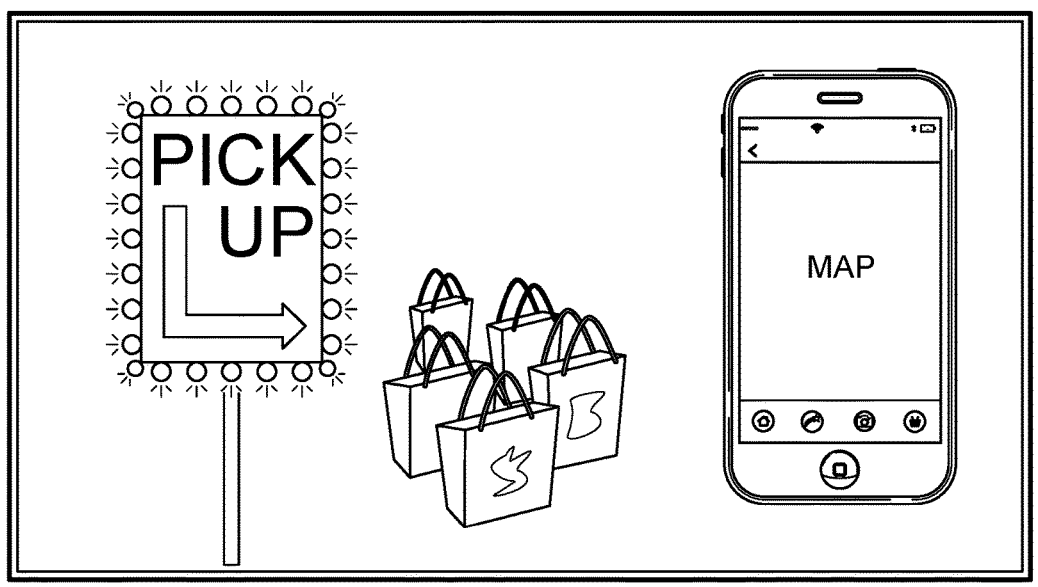
Figure 36:
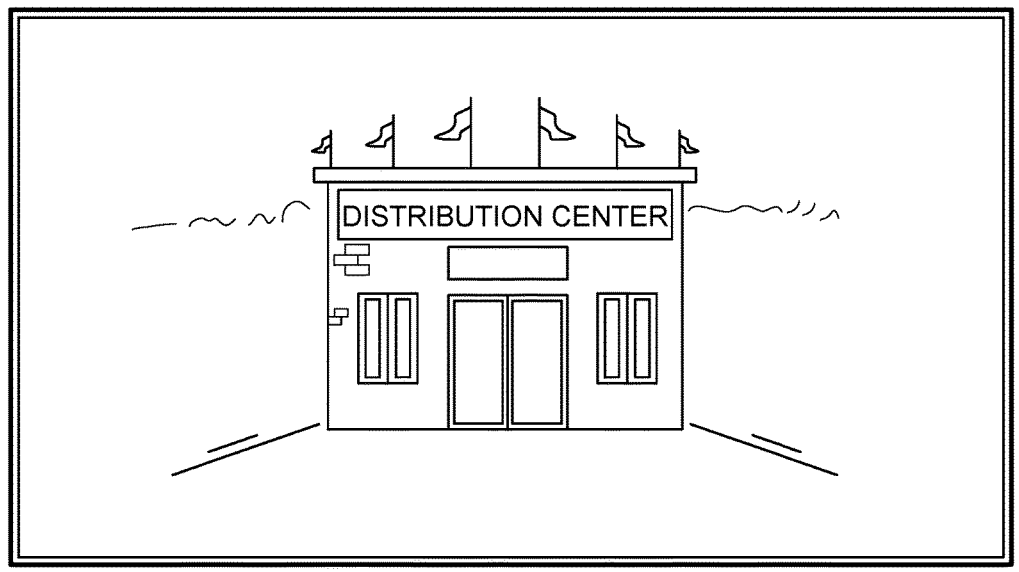
Figure 37:
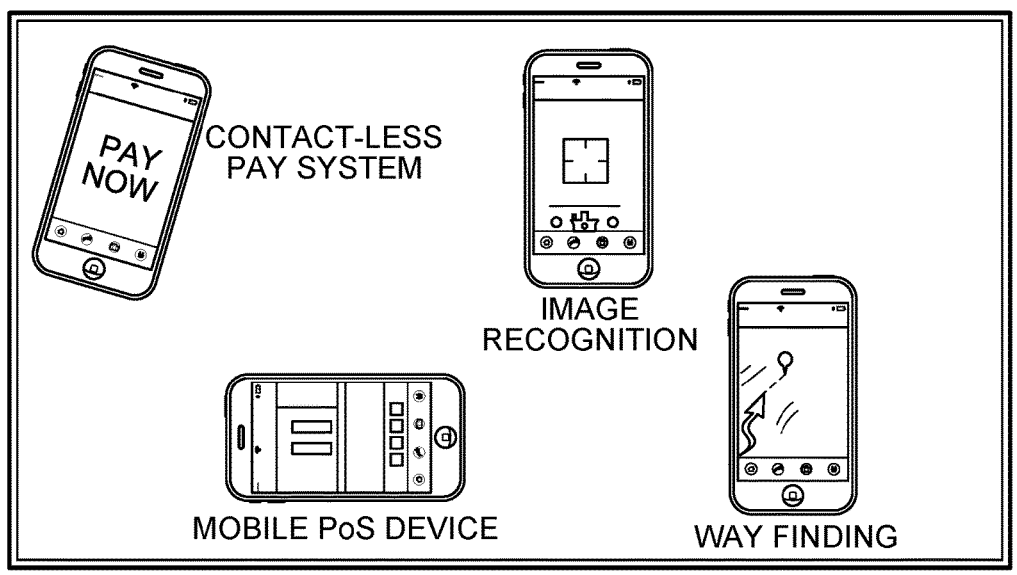

In some implementations, as shown in FIGS. 30-31, the system may facilitate delivery of a product to a guest while the guest is at an amusement park, a mall, or another location other than their home or hotel. For instance, a device may present a wish-list to the guest or another person, receive data indicating selection of a product, and present an option to deliver the selected product. In response to receipt of selection to deliver the selected product, the device may prompt the guest or other person for information about where and when to deliver the selected product. The location may be a particular location in the amusement park or the mall. The time of delivery may be a time during which the amusement park or the mall is open and the guest is at the amusement park or the mall. The device provides the system with information about the selected product and the delivery time and location. The system facilitates the delivery of the selected product to the guest, e.g., by an employee of the mall or the amusement park the guest is visiting.

Figure 38:
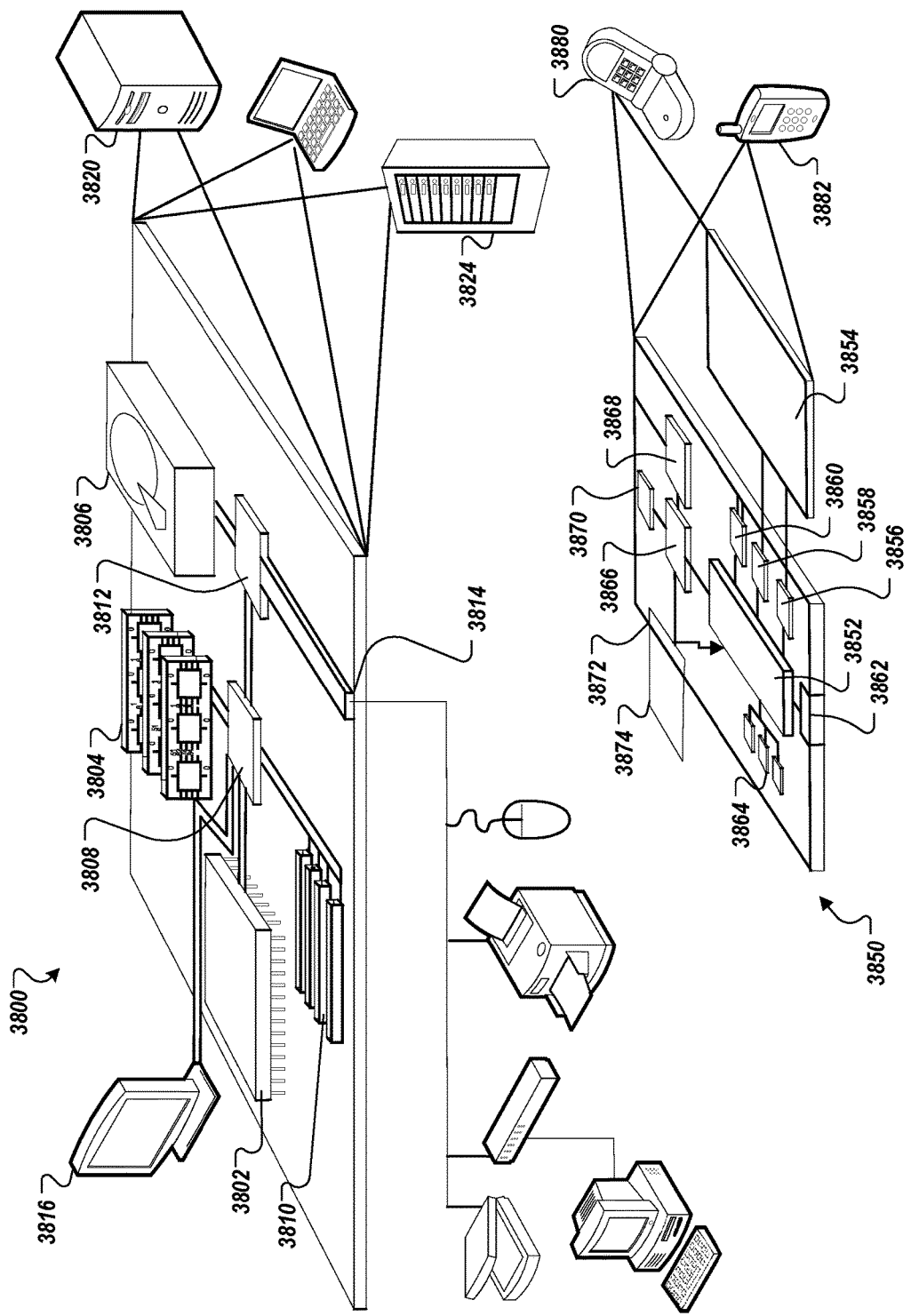
FIG. 38 is a diagram of example computing devices.

FIG. 38 shows an example of a computing device 3800 and a mobile computing device 3850 that can be used to implement the techniques described herein. The computing device 3800 is intended to represent various forms of digital computers, such as laptops, desktops, workstations, personal digital assistants, servers, blade servers, mainframes, and other appropriate computers. The mobile computing device 3850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 3800 includes a processor 3802, a memory 3804, a storage device 3806, a high-speed interface 3808 connecting to the memory 3804 and multiple high-speed expansion ports 3810, and a low-speed interface 3812 connecting to a low-speed expansion port 3814 and the storage device 3806. Each of the processor 3802, the memory 3804, the storage device 3806, the high-speed interface 3808, the high-speed expansion ports 3810, and the low-speed interface 3812, are interconnected using various busses, and may be mounted on a common motherboard or in other manners as appropriate.

The processor 3802 can process instructions for execution within the computing device 3800, including instructions stored in the memory 3804 or on the storage device 3806 to display graphical information for a graphical user interface (GUI) on an external input/output device, such as a display 3816 coupled to the high-speed interface 3808. In other implementations, multiple processors and/or multiple buses may be used, as appropriate, along with multiple memories and types of memory. Also, multiple computing devices may be connected, with each device providing portions of the necessary operations, e.g., as a server bank, a group of blade servers, or a multi-processor system.

The memory 3804 stores information within the computing device 3800. In some implementations, the memory 3804 is a volatile memory unit or units. In some implementations, the memory 3804 is a non-volatile memory unit or units. The memory 3804 may also be another form of computer-readable medium, such as a magnetic or optical disk.

The storage device 3806 is capable of providing mass storage for the computing device 3800. In some implementations, the storage device 3806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices, for example, processor 3802, perform one or more methods, such as those described above. The instructions can also be stored by one or more storage devices such as computer- or machine-readable mediums, for example, the memory 3804, the storage device 3806, or memory on the processor 3802.

The high-speed interface 3808 manages bandwidth-intensive operations for the computing device 3800, while the low-speed interface 3812 manages lower bandwidth-intensive operations. Such allocation of functions is an example only. In some implementations, the high-speed interface 3808 is coupled to the memory 3804, the display 3816, e.g., through a graphics processor or accelerator, and to the high-speed expansion ports 3810, which may accept various expansion cards (not shown).

In the implementation, the low-speed interface 3812 is coupled to the storage device 3806 and the low-speed expansion port 3814. The low-speed expansion port 3814, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 3800 may be implemented in a number of different forms, as shown in the figure. For example, it may be implemented as a standard server 3820, or multiple times in a group of such servers. In addition, it may be implemented in a personal computer such as a laptop computer 3822. It may also be implemented as part of a rack server system 3824.

Alternatively, components from the computing device 3800 may be combined with other components in a mobile device (not shown), such as a mobile computing device 3850. Each of such devices may contain one or more of the computing device 3800 and the mobile computing device 3850, and an entire system may be made up of multiple computing devices communicating with each other.

The mobile computing device 3850 includes a processor 3852, a memory 3864, an input/output device such as a display 3854, a communication interface 3866, and a transceiver 3868, among other components. The mobile computing device 3850 may also be provided with a storage device, such as a micro-drive or other device, to provide additional storage. Each of the processor 3852, the memory 3864, the display 3854, the communication interface 3866, and the transceiver 3868, are interconnected using various buses, and several of the components may be mounted on a common motherboard or in other manners as appropriate.

The processor 3852 can execute instructions within the mobile computing device 3850, including instructions stored in the memory 3864. The processor 3852 may be implemented as a chipset of chips that include separate and multiple analog and digital processors. The processor 3852 may provide, for example, for coordination of the other components of the mobile computing device 3850, such as control of user interfaces, applications run by the mobile computing device 3850, and wireless communication by the mobile computing device 3850.

The processor 3852 may communicate with a user through a control interface 3858 and a display interface 3856 coupled to the display 3854. The display 3854 may be, for example, a TFT (Thin-Film-Transistor Liquid Crystal Display) display or an OLED (Organic Light Emitting Diode) display, or other appropriate display technology. The display interface 3856 may comprise appropriate circuitry for driving the display 3854 to present graphical and other information to a user. The control interface 3858 may receive commands from a user and convert them for submission to the processor 3852.

In addition, an external interface 3862 may provide communication with the processor 3852, so as to enable near area communication of the mobile computing device 3850 with other devices. The external interface 3862 may provide, for example, for wired communication in some implementations, or for wireless communication in other implementations, and multiple interfaces may also be used.

The memory 3864 stores information within the mobile computing device 3850. The memory 3864 can be implemented as one or more of a computer-readable medium or media, a volatile memory unit or units, or a non-volatile memory unit or units. An expansion memory 3874 may also be provided and connected to the mobile computing device 3850 through an expansion interface 3872, which may include, for example, a SIMM (Single In Line Memory Module) card interface. The expansion memory 3874 may provide extra storage space for the mobile computing device 3850, or may also store applications or other information for the mobile computing device 3850.

Specifically, the expansion memory 3874 may include instructions to carry out or supplement the processes described above, and may include secure information also. Thus, for example, the expansion memory 3874 may be provided as a security module for the mobile computing device 3850, and may be programmed with instructions that permit secure use of the mobile computing device 3850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices, for example, processor 3852, perform one or more methods, such as those described above. The instructions can also be stored by one or more storage devices, such as one or more computer- or machine-readable mediums, for example, the memory 3864, the expansion memory 3874, or memory on the processor 3852. In some implementations, the instructions can be received in a propagated signal, for example, over the transceiver 3868 or the external interface 3862.

The mobile computing device 3850 may communicate wirelessly through the communication interface 3866, which may include digital signal processing circuitry where necessary. The communication interface 3866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others.

Such communication may occur, for example, through the transceiver 3868 using a radio-frequency. In addition, short-range communication may occur, such as using a Bluetooth, WiFi, or other such transceiver (not shown). In addition, a GPS (Global Positioning System) receiver module 3870 may provide additional navigation- and location-related wireless data to the mobile computing device 3850, which may be used as appropriate by applications running on the mobile computing device 3850.

The mobile computing device 3850 may also communicate audibly using an audio codec 3860, which may receive spoken information from a user and convert it to usable digital information. The audio codec 3860 may likewise generate audible sound for a user, such as through a speaker, e.g., in a handset of the mobile computing device 3850. Such sound may include sound from voice telephone calls, may include recorded sound, e.g., voice messages, music files, etc., and may also include sound generated by applications operating on the mobile computing device 3850.

The mobile computing device 3850 may be implemented in a number of different forms, as shown in the figure. For example, it may be implemented as a cellular telephone 3880. It may also be implemented as part of a smart-phone 3882, personal digital assistant, or other similar mobile device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus.

Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system.

A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method comprising:
   receiving a query that was initiated by a user;
   identifying a particular item based at least on the query;
   identifying multiple physical locations where the particular item may be obtained;
   generating a ranking of the multiple physical locations based at least on
      which particular entrance, of multiple possible entrances that are associated with a facility, that was used by the user to enter the facility; and
   providing a results page in response to the query, the results page identifying one or more of the physical locations according to the ranking.

2. The method of claim 1, wherein the ranking is generated further based on:
   a location where the user has parked a vehicle.

3. The method of claim 1, wherein the ranking is generated further based on:
   a location of a hotel of the user.

4. The method of claim 1, wherein the ranking is generated further based on:
   data indicating whether the particular item is available for delivery to a location where the user has parked the vehicle, or to the particular entrance used by the user to enter the facility, by a respective agent associated with each of the multiple physical locations.

5. The method of claim 1, wherein the ranking is generated further based on:
   an itinerary within the facility for the user.

6. The method of claim 1, wherein the ranking is generated further based on:
a predicted line waiting time associated with each of the multiple physical locations.

7. The method of claim 1, wherein the ranking is generated further based on:
an amusement park ride reservation time associated with the user.

8. The method of claim 1, wherein the ranking is generated further based on:
a predicted waiting time associated with the amusement park ride that is associated with the user.

9. A system comprising:
one or more computers and one or more storage devices storing instructions that are operable, when executed by the one or more computers, to cause the one or more computers to perform operations comprising:
receiving a query that was initiated by a user;
identifying a particular item based at least on the query;
identifying multiple physical locations where the particular item may be obtained;
generating a ranking of the multiple physical locations based at least on
data indicating whether the particular item is available for delivery to the location where the user has parked the vehicle, or to the entrance used by the user to enter a facility, by a respective agent associated with each of the multiple physical locations; and
providing a results page in response to the query, the results page identifying one or more of the physical locations according to the ranking.

10. The system of claim 9, wherein the ranking is generated further based on:
a location where the user has parked a vehicle.

11. The system of claim 9, wherein the ranking is generated further based on:
a location of a hotel of the user.

12. The system of claim 9, wherein the ranking is generated further based on:
an entrance used by the user to enter a facility.

13. The system of claim 9, wherein the ranking is generated further based on:
an itinerary within the facility for the user.

14. The system of claim 9, wherein the ranking is generated further based on:
a predicted line waiting time associated with each of the multiple physical locations.

15. The system of claim 9, wherein the ranking is generated further based on:
an amusement park ride reservation time associated with the user.

16. The system of claim 9, wherein the ranking is generated further based on:
a predicted waiting time associated with the amusement park ride that is associated with the user.

17. A computer program product, encoded on one or more non-transitory computer storage media, comprising instructions that when executed by one or more computers cause the one or more computers to perform operations comprising:
receiving a query that was initiated by a user;
identifying a particular item based at least on the query;
identifying multiple physical locations where the particular item may be obtained;
generating a ranking of the multiple physical locations based at least on
an itinerary within a facility for the user, or a predicted line waiting time associated with each of the multiple physical locations, or an amusement park ride reservation time associated with the user, or a predicted waiting time associated with an amusement park ride that is associated with the user; and
providing a results page in response to the query, the results page identifying one or more of the physical locations according to the ranking.

* * * * *